US011332212B2

(12) United States Patent
Ichikawa et al.

(10) Patent No.: US 11,332,212 B2
(45) Date of Patent: May 17, 2022

(54) SADDLE-TYPE ELECTRIC VEHICLE

(71) Applicant: HONDA MOTOR CO., LTD., Tokyo (JP)

(72) Inventors: Hiroki Ichikawa, Wako (JP); Takafumi Yamaguchi, Wako (JP); Jun Ishikawa, Wako (JP); Kazuo Tsuji, Wako (JP); Katsuyuki Okubo, Wako (JP); Yoshitaka Kobayashi, Wako (JP); Akira Kuramochi, Wako (JP); Toshifumi Shimamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 113 days.

(21) Appl. No.: 16/642,028

(22) PCT Filed: Sep. 29, 2017

(86) PCT No.: PCT/JP2017/035483
§ 371 (c)(1),
(2) Date: Feb. 26, 2020

(87) PCT Pub. No.: WO2019/064492
PCT Pub. Date: Apr. 4, 2019

(65) Prior Publication Data
US 2020/0239097 A1    Jul. 30, 2020

(51) Int. Cl.
*B62K 11/00*    (2006.01)
*B60L 50/60*    (2019.01)
(Continued)

(52) U.S. Cl.
CPC .............. *B62K 11/00* (2013.01); *B60L 50/60* (2019.02); *B60L 53/18* (2019.02); *B62M 7/12* (2013.01);
(Continued)

(58) Field of Classification Search
CPC ..................... B62K 11/00; B62K 2204/00; B62K 2202/00; B60L 50/60; B60L 53/18;
(Continued)

(56) References Cited

U.S. PATENT DOCUMENTS

2012/0080249 A1* 4/2012 Yates, III .................. B60L 7/18
180/65.31
2013/0228389 A1* 9/2013 Nakashima ............ B62K 11/00
180/220

(Continued)

FOREIGN PATENT DOCUMENTS

CN    101847737    *    9/2010
CN    102481963        5/2012
(Continued)

OTHER PUBLICATIONS

International Search Report and Written Opinion for International Application No. PCT/JP2017/035483 dated Nov. 7, 2017, 8 pages.
(Continued)

*Primary Examiner* — Minnah L Seoh
*Assistant Examiner* — Marlon A Arce
(74) *Attorney, Agent, or Firm* — Amin, Turocy & Watson, LLP

(57) ABSTRACT

A saddle-type electric vehicle (1, 1A, or 1B) includes an electric motor (30) for vehicle traveling, a battery (100) which supplies electric power to the electric motor (30), a power control unit (320) which controls the electric motor (30), step floors (9) on which a rider places his/her feet, a center tunnel (CT) which extends in a vehicle front-rear direction at a left-right center portion of the step floors (9), and a charger (325) mounted on the vehicle body and configured to charge the battery (100), in which the power control unit (320) is disposed inside the center tunnel (CT), (Continued)

and the charger (325) is disposed to overlap the power control unit (320) in a plan view.

4 Claims, 25 Drawing Sheets

(51) Int. Cl.
    *B60L 53/18*         (2019.01)
    *B62M 7/12*        (2006.01)
    *B62J 43/16*         (2020.01)
    *B62J 43/28*         (2020.01)

(52) U.S. Cl.
    CPC ............ *B60L 2200/12* (2013.01); *B62J 43/16* (2020.02); *B62J 43/28* (2020.02)

(58) Field of Classification Search
    CPC ....... B60L 2200/12; B62J 45/20; B62J 43/16; B62J 43/28; B62M 7/12; Y02T 90/14; Y02T 10/7072; Y02T 10/70
    See application file for complete search history.

(56) References Cited

U.S. PATENT DOCUMENTS

2013/0288841 A1* 10/2013 Yoshino ................. B60L 50/66
                                                            475/149

2014/0001838 A1* 1/2014 Watanabe ............... B60R 16/02
                                                            307/9.1
2020/0189379 A1* 6/2020 Hirukawa .............. B62D 25/20

FOREIGN PATENT DOCUMENTS

| | | |
|---|---|---|
| CN | 102649452 | 8/2012 |
| CN | 102729837 | 10/2012 |
| CN | 102019986 | 7/2013 |
| CN | 205396359 | 7/2016 |
| EP | 2979962 | 2/2016 |
| JP | 06-135370 | 5/1994 |
| JP | 10-056741 | 2/1998 |
| JP | 2002-325369 | 11/2002 |
| JP | 2012-101702 | 5/2012 |
| JP | 2012-153327 | 8/2012 |
| JP | 5525998 | 6/2014 |
| JP | 5658538 | 1/2015 |
| JP | 2016-030585 | 3/2016 |

OTHER PUBLICATIONS

Extended European Search Report for European Patent Application No. 17926763.8 dated Aug. 4, 2020.

Chinese Office Action for Chinese Patent Application No. 201780095202.0 dated Nov. 26, 2020.

\* cited by examiner

SADDLE-TYPE ELECTRIC VEHICLE

TECHNICAL FIELD

The present invention relates to a saddle-type electric vehicle.

BACKGROUND ART

For example, Patent Literature 1 discloses a saddle-type electric vehicle in which a battery is disposed in a center tunnel.

CITATION LIST

Patent Literature

[Patent Literature 1]
Japanese Unexamined Patent Application, First Publication No. 2012-153327

SUMMARY OF INVENTION

Technical Problem

Incidentally, the above-described saddle-type electric vehicle includes a power control unit which controls the energy supplied from a battery to an electric motor, and a charger (charger) which converts alternating current power supplied from an external power current into direct current power and supplies it to the battery. In Patent Literature 1, a power control unit is disposed in a space behind the battery and thus an influence of disturbances on the power control unit is easy to reduce, but heat tends to accumulate around the power control unit. Although there is no description about a disposition of a charger, an efficient disposition of heat generating components such as a charger that does not generate heat during travel is required.

Therefore, the present invention provides a saddle-type electric vehicle in which heat generating components including a charger that generates heat when a battery is charged by an external power supply can be efficiently disposed.

Solution to Problem

One aspect of the present invention is a saddle-type electric vehicle including a saddle-type electric vehicle (1, 1A, or 1B) including an electric motor (30) for vehicle traveling, a battery (100) which supplies electric power to the electric motor (30), a power control unit (320) which controls the electric motor (30), step floors (9) on which a rider places his/her feet, a center tunnel (CT) which extends in a vehicle front-rear direction at a left-right center portion of the step floors (9), and a charger (325) mounted on the vehicle body and configured to charge the battery (100), wherein the power control unit (320) is disposed inside the center tunnel (CT), and the charger (325) is disposed to overlap the power control unit (320) in a plan view.

According to this configuration, the charger is disposed above or below the power control unit. When the charger is disposed above the power control unit, the charger can be easily accessed from above and usability of the charger can be improved.

When the charger is disposed below the power control unit, heat of the power control unit can be easily released upward and a cooling performance of the power control unit can be improved. Also, when the charger is disposed below the power control unit, an influence of disturbances from below the vehicle on the power control unit during travel can be reduced and the power control unit can be better protected.

In one aspect of the present invention, the charger (325) may be disposed below the power control unit (320).

According to this configuration, heat of the power control unit can be easily released upward and a cooling performance of the power control unit can be improved. Also, an influence of disturbances from below the vehicle on the power control unit during travel can be reduced and the power control unit can be better protected.

One aspect of the present invention may further include a contactor (324) which switches high-voltage lines between at the time of vehicle traveling and at the time of battery charging, in which the contactor (324) may be disposed above the power control unit (320).

According to this configuration, the contactor and the charger are separated from each other with the power control unit therebetween. Therefore, even when the charger and the contactor generate heat during battery charging (particularly during quick charging), heat affected from each other between the charger and the contactor can be reduced.

One aspect of the present invention may further include a cable storage part (230) which is able to store a charging cable (245), in which the cable storage part (230) may be disposed above the power control unit (320).

According to this configuration, an area in the center tunnel is efficiently used so that the power control unit, the charger, and the charging cable can be stored.

Advantageous Effects of Invention

According to the aspect of the present invention, it is possible to provide a saddle-type electric vehicle in which heat generating components including a charger that generates heat when a battery is charged by an external power supply can be efficiently disposed.

BRIEF DESCRIPTION OF DRAWINGS

FIG. 25(*a*) is a view illustrating a stored state of the charging cord according to the embodiment. FIG. 25(*b*) is a view illustrating a first method of drawing out the charging cord according to the embodiment. FIG. 25(*c*) is a view illustrating a second method of drawing out the charging cord according to the embodiment.

DESCRIPTION OF EMBODIMENTS

Figure 1:
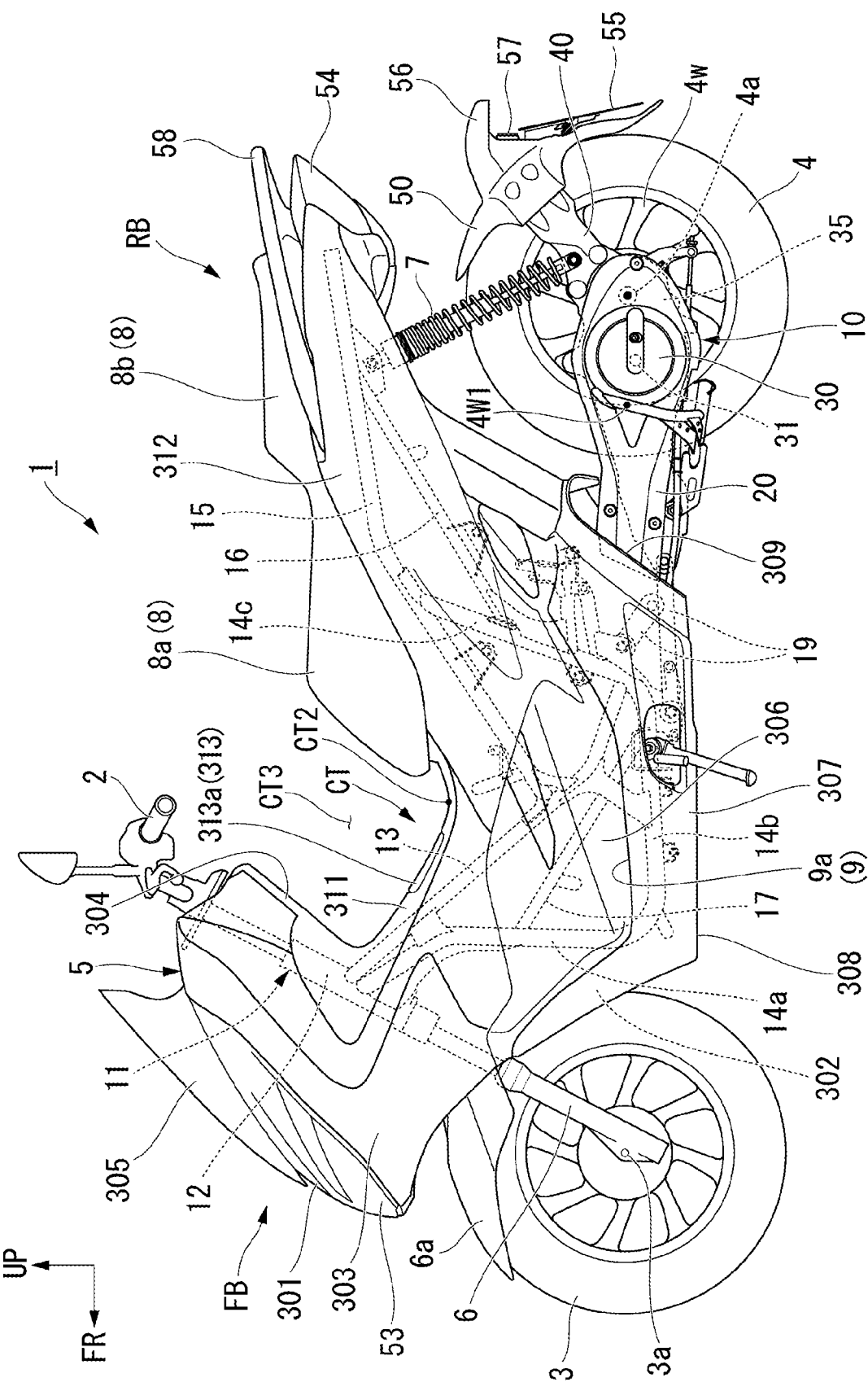
FIG. 1 is a left side view of a motorcycle according to an embodiment.

Hereinafter, embodiments of the present invention will be described with reference to the drawings. In the following description, directions such as forward, rearward, left, and right are the same as directions in a vehicle to be described below unless otherwise specified. Also, an arrow FR indicating toward the front of the vehicle, an arrow LH indicating toward the left of the vehicle, an arrow UP indicating toward the top of the vehicle, and a line CL indicating a vehicle body left-right center are illustrated at suitable positions in the drawings used for the following description.

<Entire Vehicle>

FIG. 1 illustrates a motorcycle 1 of a unit swing type as an example of a saddle-type electric vehicle. The motorcycle 1 includes a front wheel 3 serving as a steering wheel and a rear wheel 4 serving as a drive wheel. The front wheel 3 is supported by a front fork 6 and is steerable by a bar handle 2. A front fender 6*a* is supported by the front fork 6.

The rear wheel 4 is supported by a swing unit 10 and can be driven by an electric motor 30. The swing unit 10 includes the electric motor 30 and a speed reducer 35 which reduces a driving force of the electric motor 30 and transmits it to a rear wheel axle 4*a*. A rear fender 50 is supported by a rear end portion of the swing unit 10 via a fender support arm 40. A lower end portion of a rear cushion 7 is connected to the fender support arm 40.

Components of a steering system including the bar handle 2, the front fork 6 and the front wheel 3 are supported by a front end portion of a vehicle body frame 11 to be steerable. The swing unit 10 and the rear wheel 4 are supported by a lower portion of the vehicle body frame 11 to be vertically swingable. A vicinity of the vehicle body frame 11 is covered with a vehicle body cover 5. The vehicle body frame 11 and the vehicle body cover 5 are main constituents of the vehicle body (on a spring) of the motorcycle 1.

Figure 7:
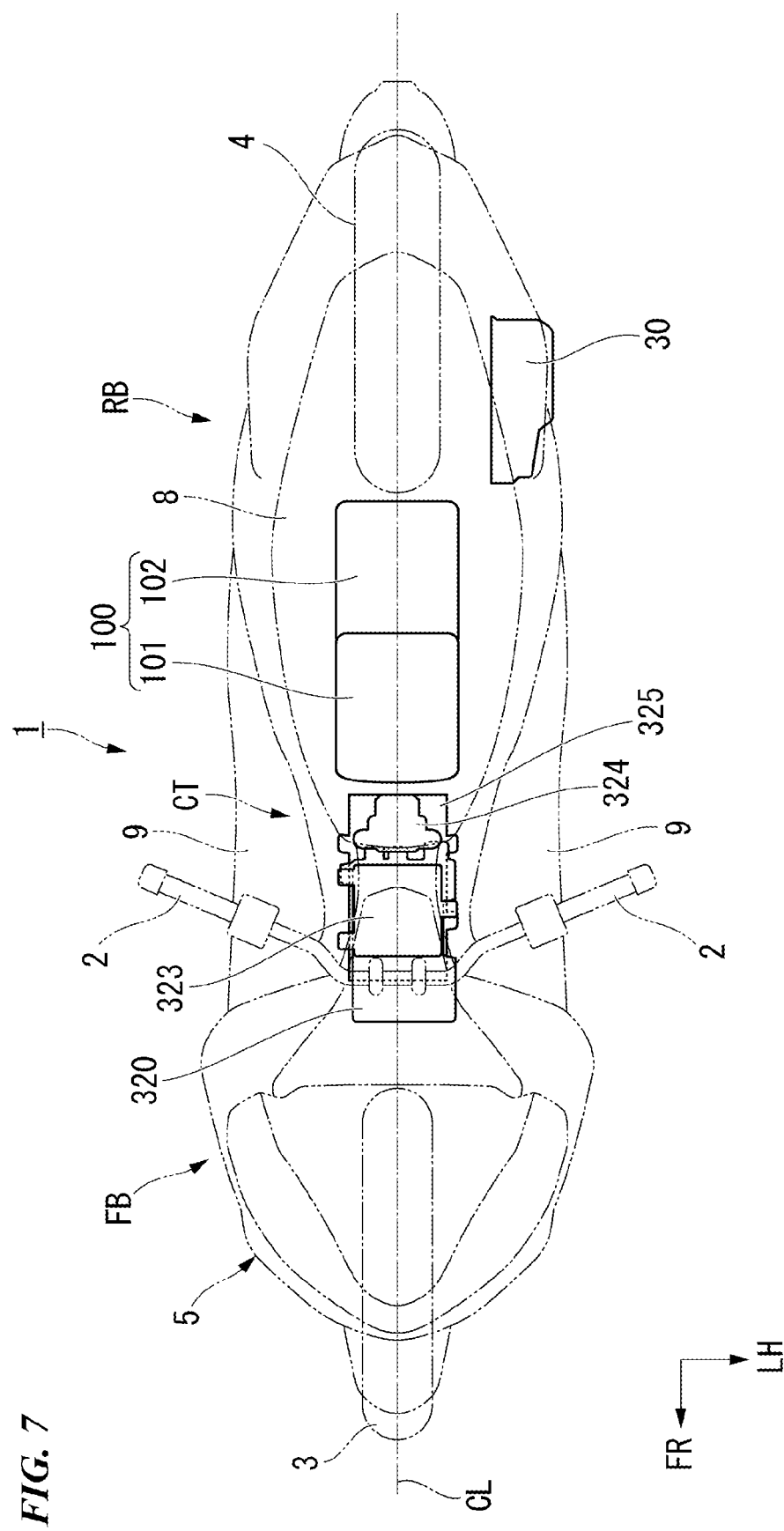
FIG. 7 is a top view illustrating a disposition of specific components according to the embodiment.

Referring also to FIG. 7, the motorcycle 1 includes a pair of left and right step floors 9 on which a driver seated on a seat 8 places his/her feet, a center tunnel CT extending in a vehicle front-rear direction between the left and right step floors 9, a front body FB which is continuous with the front of the center tunnel CT and the left and right step floors 9, and a rear body RB which is continuous with the rear of the center tunnel CT and the left and right step floors 9.

Figure 3:
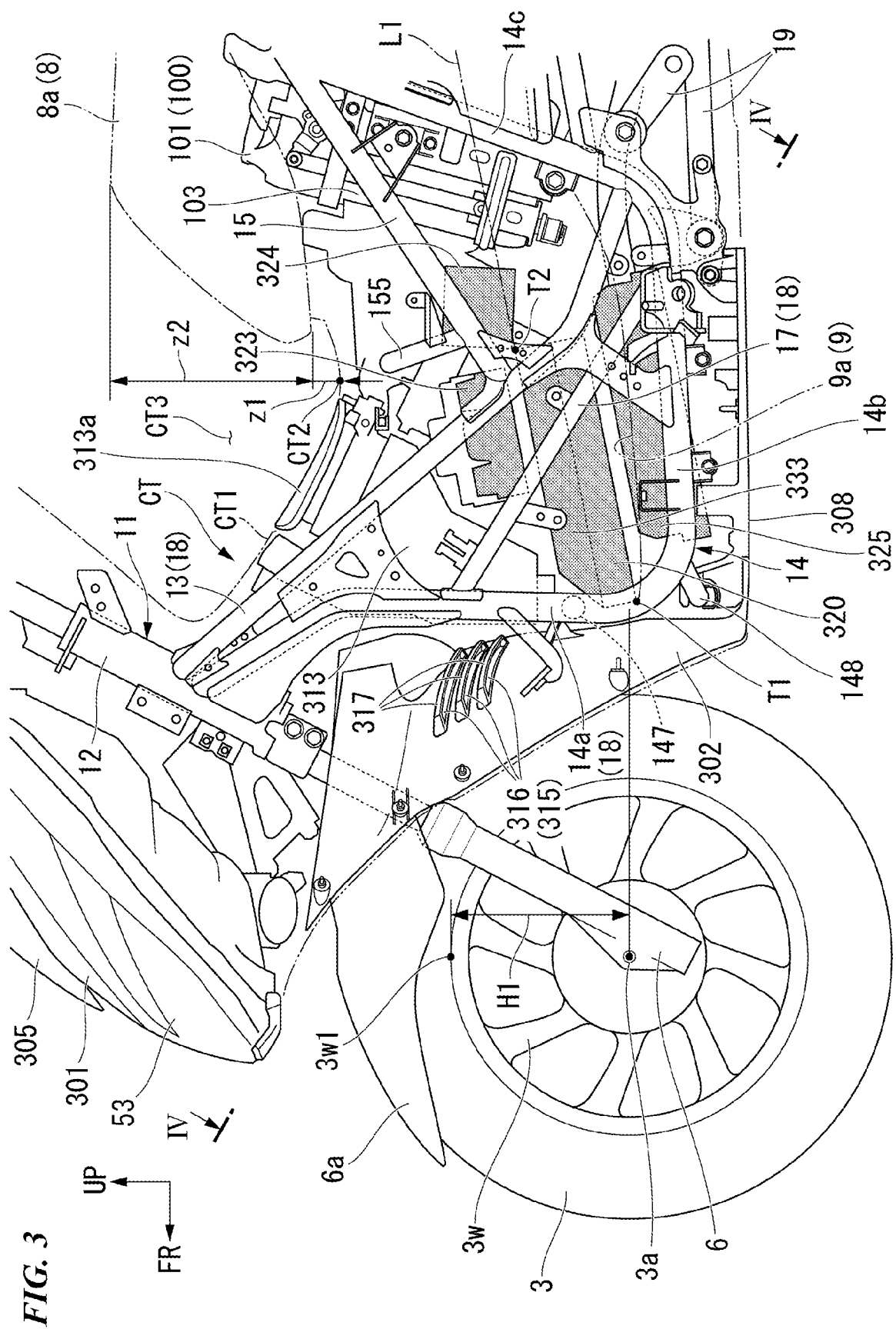
FIG. 3 is a left side view illustrating a disposition of components in a center tunnel according to the embodiment.

Referring also to FIG. 3, the center tunnel CT extends such that an upper surface portion CT1 is inclined downward toward the rear behind the front body FB. The center tunnel CT is connected to the rear body RB with a rear side of the upper surface portion CT1 curved upward. Hereinafter, a curved lower end portion on the rear side of the upper surface portion CT1 of the center tunnel CT is referred to as a lowest portion CT2.

The lowest portion CT2 is positioned on a side above an upper end of the front wheel 3. The lowest portion CT2 is disposed in the vicinity of a lower end portion of the seat 8 (front seat 8*a*). In a side view, a distance z1 in a vertical direction between the lowest portion CT2 and the lower end portion of the front seat 8*a* is smaller than a thickness z2 in a vertical direction of the front seat 8*a*. A distance from floor surfaces 9*a* to the lowest portion CT2 is larger than a distance from the lowest portion CT2 to an upper surface of the front seat 8*a*.

When the motorcycle 1 is configured such that the center tunnel CT is provided on the step floors 9, the center tunnel CT can be sandwiched between the left and right feet of a rider while giving a degree of freedom to rider's footrest positions. Therefore, comfort around the rider's feet and controllability of the vehicle body are secured. The center tunnel CT constitutes a low floor part of the motorcycle 1. A straddling space CT3 that allows the rider to easily straddle the vehicle body is formed above the center tunnel CT.

Referring to FIG. 1 again, a front combination lamp 53 including a headlamp and a windscreen 305 are disposed on a front upper portion of the front body FB. A rear combination lamp 54 including a brake lamp and a grab rail 58 are disposed on the rear portion of the rear body RB. On the rear body RB, the seat 8 on which the rider is seated is supported. The seat 8 integrally has the front seat 8*a* on which the driver is seated and a rear seat 8*b* on which a fellow rider on a rear side is seated.

A lower side of a front end portion of the seat 8 is connected to the vehicle body via a hinge shaft extending in a vehicle width direction (left-right direction). The seat 8 vertically rotates with the hinge shaft as a center to open and close an upper portion of the rear body RB. When the seat 8 is in a closed state (see FIG. 1) in which the upper portion of the rear body RB is closed, the rider can be seated on the seat 8. When the seat 8 is in an open state in which the upper portion of the rear body RB is open, an article or space below the seat 8 can be accessed. The seat 8 can be locked in the closed state.

<Vehicle Body Frame>

Figure 8:
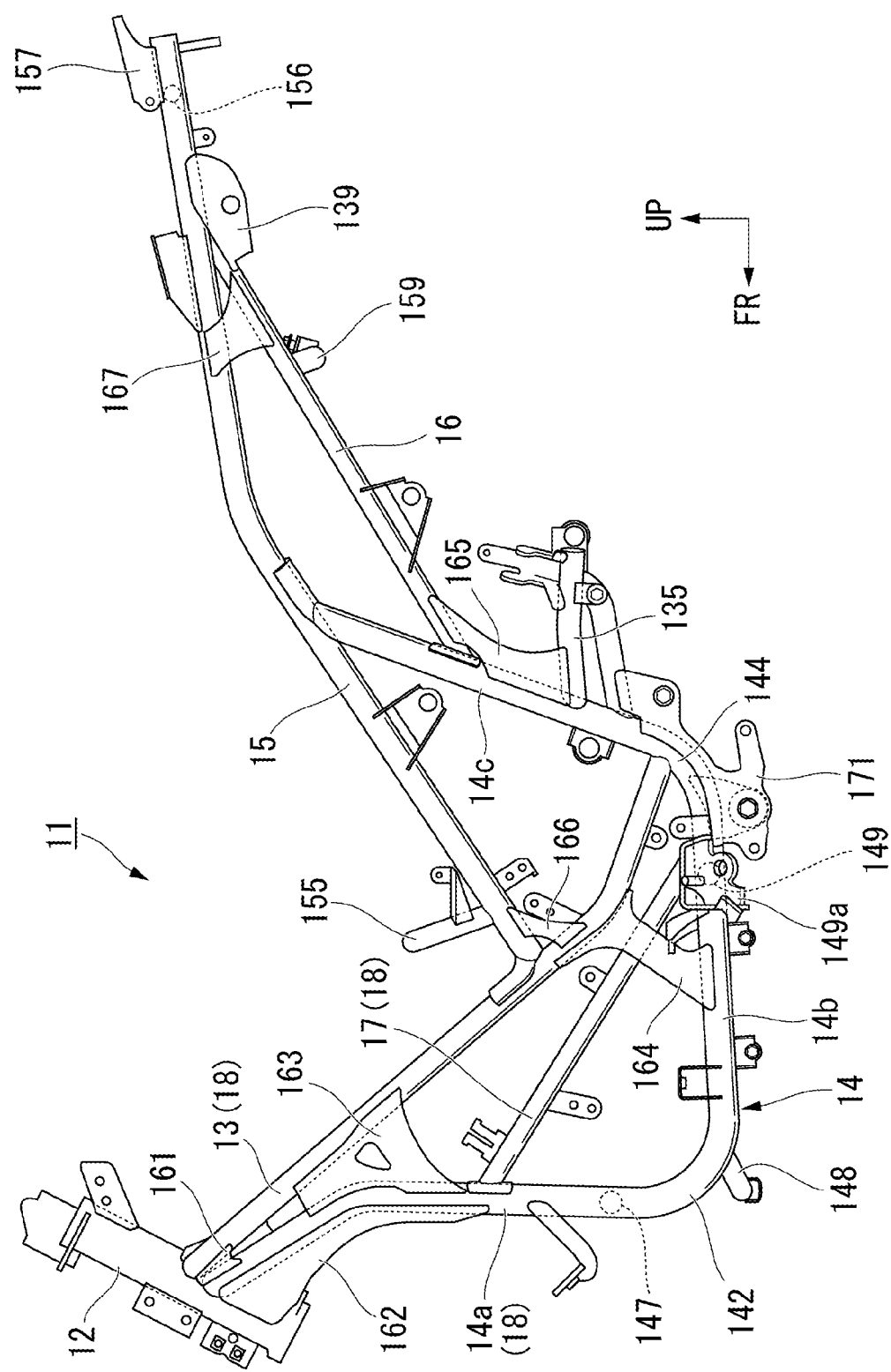
FIG. 8 is a left side view of a vehicle body frame according to the embodiment.
Figure 9:
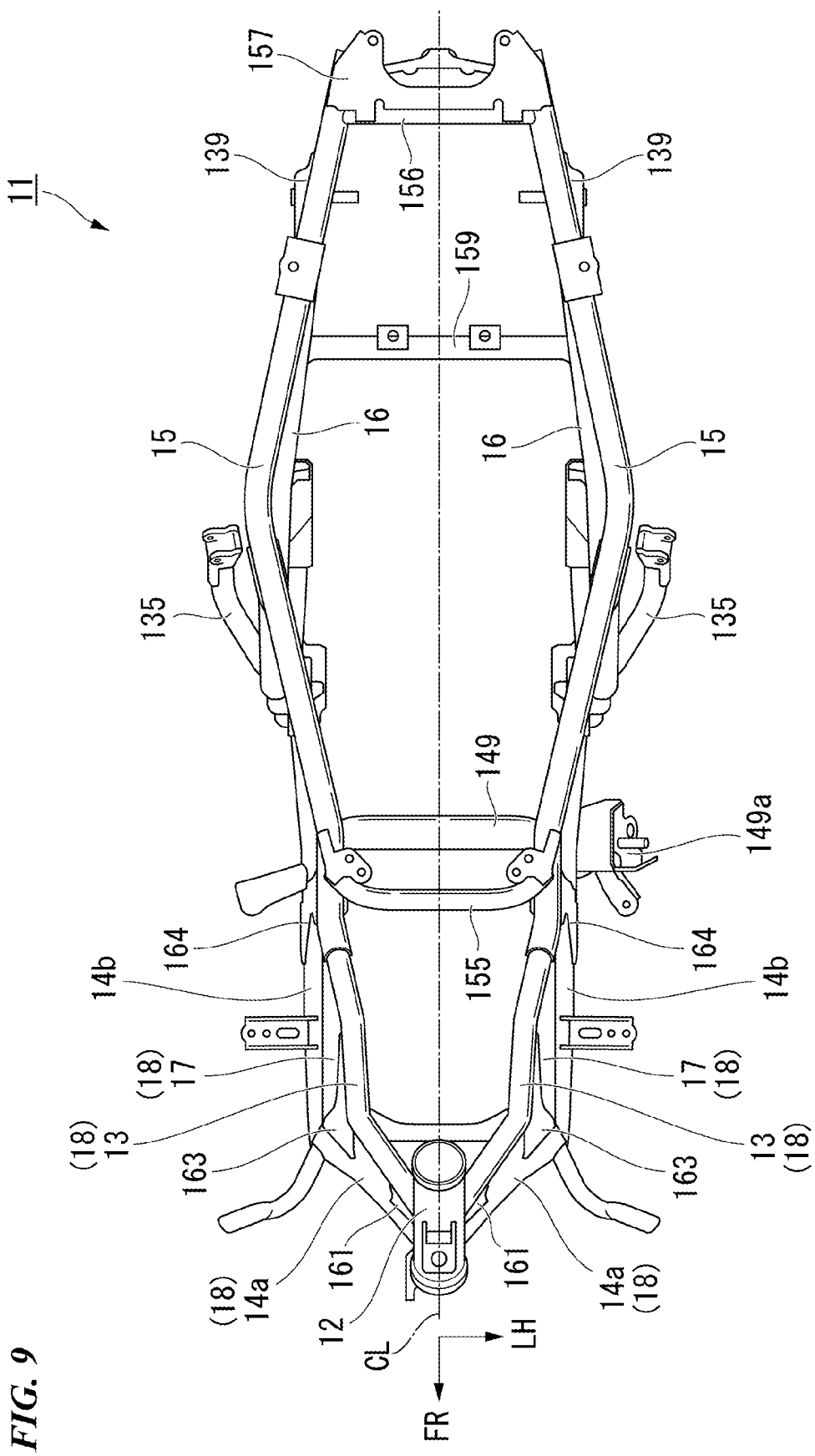
FIG. 9 is a top view of the vehicle body frame according to the embodiment.
Figure 10:
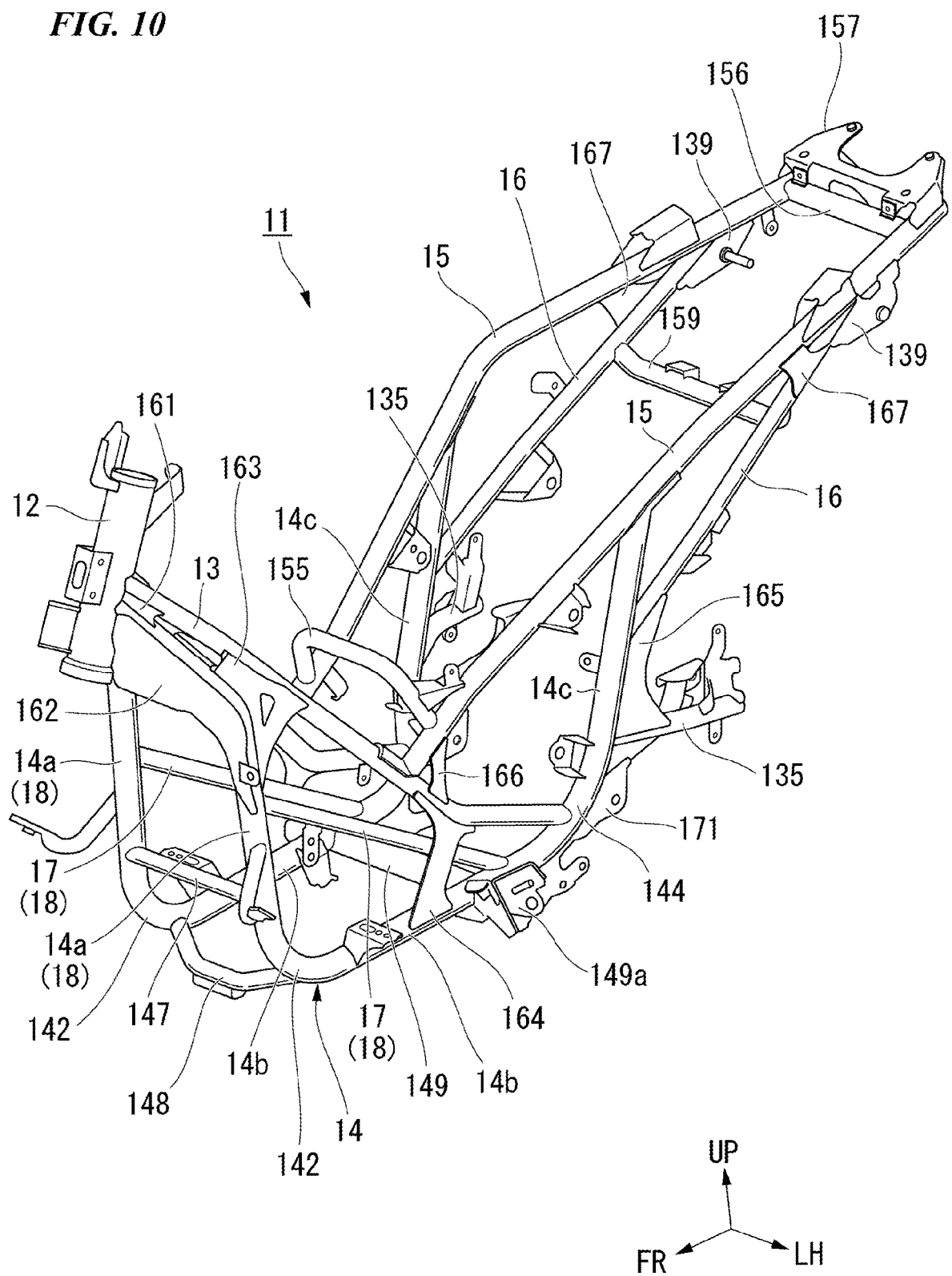
FIG. 10 is a perspective view of the vehicle body frame according to the embodiment when viewed from above and from the left.

As illustrated in FIGS. 8 to 10, the vehicle body frame 11 is formed by integrally joining steel pieces of a plurality of types by welding or the like. The vehicle body frame 11 includes a head pipe 12 positioned at a front end portion, a pair of left and right down frames 14*a* extending downward from the head pipe 12, a pair of left and right lower frames 14*b* extending rearward from lower end portions of the left and right down frames 14a, a pair of left and right rear frames 14c extending upward and rearward from rear end portions of the left and right lower frames 14b, a pair of left and right upper frames (main frames) 13 extending downward and rearward from the head pipe 12 above the left and right down frames 14a, a pair of left and right middle frames 17 extending downward and rearward from vertically intermediate portions of the left and right down frames 14a, a pair of left and right rear upper frames (seat frames) 15 extending upward and rearward from front-rear intermediate portions of the left and right upper frames 13, and a pair of left and right rear lower frames (support frames) 16 extending upward and rearward from vertically intermediate portions of the left and right rear frames 14c. For example, the respective frame members may be formed of round steel pipes. The term "intermediate" used in the present embodiment is meant to include not only a center between opposite ends of an object but also an inner range between opposite ends of the object.

The down frame 14a and the lower frame 14b are integrally continuous via a front lower bent part 142. The lower frame 14b and the rear frame 14c are integrally continuous via a rear lower bent part 144. The down frame 14a, the lower frame 14b, and the rear frame 14c are integrally formed of a round steel pipe. The down frame 14a, the lower frame 14b, and the rear frame 14c form a U-shaped underframe 14 in a side view. Hereinafter, a portion including the down frame 14a, the upper frame 13, and the middle frame 17 is referred to as a down frame part 18 that extends downward and rearward from the head pipe 12. A pair of left and right down frame parts 18 are provided, and control system components such as a power control unit (PCU) 320 (see FIG. 2) are disposed between the left and right down frame parts 18.

An upper end portion of the rear frame 14c is connected to a front-rear intermediate portion of the rear upper frame 15 from below. The rear upper frame 15 is formed of a round steel pipe having substantially the same diameter as the down frame 14a, the lower frame 14b, and the rear frame 14c.

A lower rear end portion of the upper frame 13 is connected to the rear lower bent part 144 from an upper front side. A lower rear end portion of the middle frame 17 is connected to a rear portion of the lower frame 14b from above.

An upper rear end portion of the rear lower frame 16 is connected to a rear portion of the rear upper frame 15 from below. The upper frame 13, the middle frame 17, and the rear lower frame 16 are formed of a round steel pipe having a slightly smaller diameter than the rear upper frame 15 or the like.

The down frame 14a extends rearward from the head pipe 12 such that it obliquely extends downward and rearward and then is bent to extend substantially vertically downward in a side view. The left and right down frames 14a extend rearward from the head pipe 12 such that they obliquely extend outward in the vehicle width direction and then are bent to extend substantially parallel to lateral surfaces of the vehicle body in a plan view.

A front middle stage cross frame 147 is provided between lower portions of the left and right down frames 14a. The front middle stage cross frame 147 extends in a straight line in the vehicle width direction and is connected to the left and right down frames 14a from inward sides in the vehicle width direction. A front lower cross frame 148 is provided between the left and right front lower bent parts 142. The front lower cross frame 148 extends in a curved shape that is convex downward and forward and is connected to the left and right front lower bent parts 142 from inward sides in the vehicle width direction. The front middle stage cross frame 147 and the front lower cross frame 148 are formed of a round steel pipe having a smaller diameter than the down frame 14a or the like.

The lower frame 14b extends substantially in the vehicle front-rear direction. A lower cross frame 149 is provided between the left and right lower frames 14b. The lower cross frame 149 extends in a straight line in the vehicle width direction and is connected to the left and right lower frames 14b from inward sides in the vehicle width direction. The lower cross frame 149 is formed of a round steel pipe having substantially the same diameter as the lower frame 14b or the like. A side stand bracket 149a is attached to a portion of the left lower frame 14b that overlaps the lower cross frame 149 in a side view.

The rear lower bent part 144 on a side behind the lower frame 14b is formed to be inclined such that it is positioned further outward in the vehicle width direction as it is positioned further upward. A lower portion of the rear frame 14c is inclined such that it is positioned further outward in the vehicle width direction as it is positioned further upward in accordance with the inclination of the rear lower bent part 144. The rear frame 14c is gently curved inward in the vehicle width direction above the lower portion and extends substantially parallel to the side surface of the vehicle body.

A front half part of the rear upper frame 15 extends to be inclined such that it is positioned further outward in the vehicle width direction as it is positioned further toward the rear in a plan view, and extends to be inclined upward toward the rear in a side view. A rear half part of the rear upper frame 15 is bent at a rear end of the front half part and then extends to be inclined such that it is positioned further inward in the vehicle width direction as it is positioned further toward the rear in a plan view, and extends upward toward the rear with a lower inclination than that of the front half part in a side view.

A center cross frame 155 is provided between front portions of the left and right rear upper frames 15. The center cross frame 155 extends in a curved shape that is convex upward and forward (angulated U shape in detail). The center cross frame 155 is formed of a round steel pipe having a smaller diameter than the rear upper frame 15 or the like. A rear cross frame 156 and a rear cross plate 157 are provided between rear end portions of the left and right rear upper frames 15.

The rear lower frames 16 extend substantially parallel to the front half parts of the rear upper frames 15 in a side view and are connected to rear half parts of the left and right rear upper frames 15 from below. A rear lower cross frame 159 is provided between rear portions of the left and right rear lower frames 16.

The upper frame 13 linearly extends rearward from the head pipe 12 and downward and rearward in a side view. The upper frames 13 extend rearward from the head pipe 12 such that they obliquely extend outward in the vehicle width direction, then are bent, and extend substantially parallel to the lateral surfaces of the vehicle body in a plan view. The left and right upper frames 13 are positioned on an inward side in the vehicle width direction of the left and right down frames 14a in a plan view. Rear portions of the left and right upper frames 13 are inclined such that they are positioned further outward in the vehicle width direction as they are positioned further toward the rear in a plan view.

The middle frames 17 linearly extend downward and rearward in a side view and extend substantially parallel to the lateral surfaces of the vehicle body in a plan view. The middle frames 17 are disposed to be positioned on an inward side in the vehicle width direction between the lower frames 14*b* and the upper frames 13 in a plan view.

In the drawing, reference sign 135 denotes a step support stay attached to the lower portion of the rear frame 14*c* and configured to support a pillion step (not illustrated), reference sign 139 denotes a cushion support bracket which supports an upper end portion of the rear cushion 7, reference sign 161 denotes an intermediate gusset which connects a front upper end portion of the upper frame 13 and a front upper end portion of the down frame 14*a*, reference sign 162 denotes a front gusset which connects front upper portions of the left and right down frames 14*a* at a lower portion behind the head pipe 12, reference sign 163 denotes an upper gusset which connects front portions of the upper frame 13 and the down frame 14*a*, reference sign 164 denotes a lower gusset which connects rear portions of the upper frame 13 and the lower frame 14*b*, reference sign 165 denotes a side gusset which connects a front end portion of the rear lower frame 16 and the step support stay 135, reference sign 166 denotes a middle gusset which connects a front end portion of the rear upper frame 15 and the upper frame 13, reference sign 167 denotes a rear gusset which connects a rear end portion of the rear lower frame 16 and the rear upper frame 15, and reference sign 171 denotes a lower bracket provided along a downward and rearward side of the rear lower bent part 144 of the under frame 14 so that a link mechanism 19 can be connected thereto.

<Vehicle Body Cover>

Figure 4:
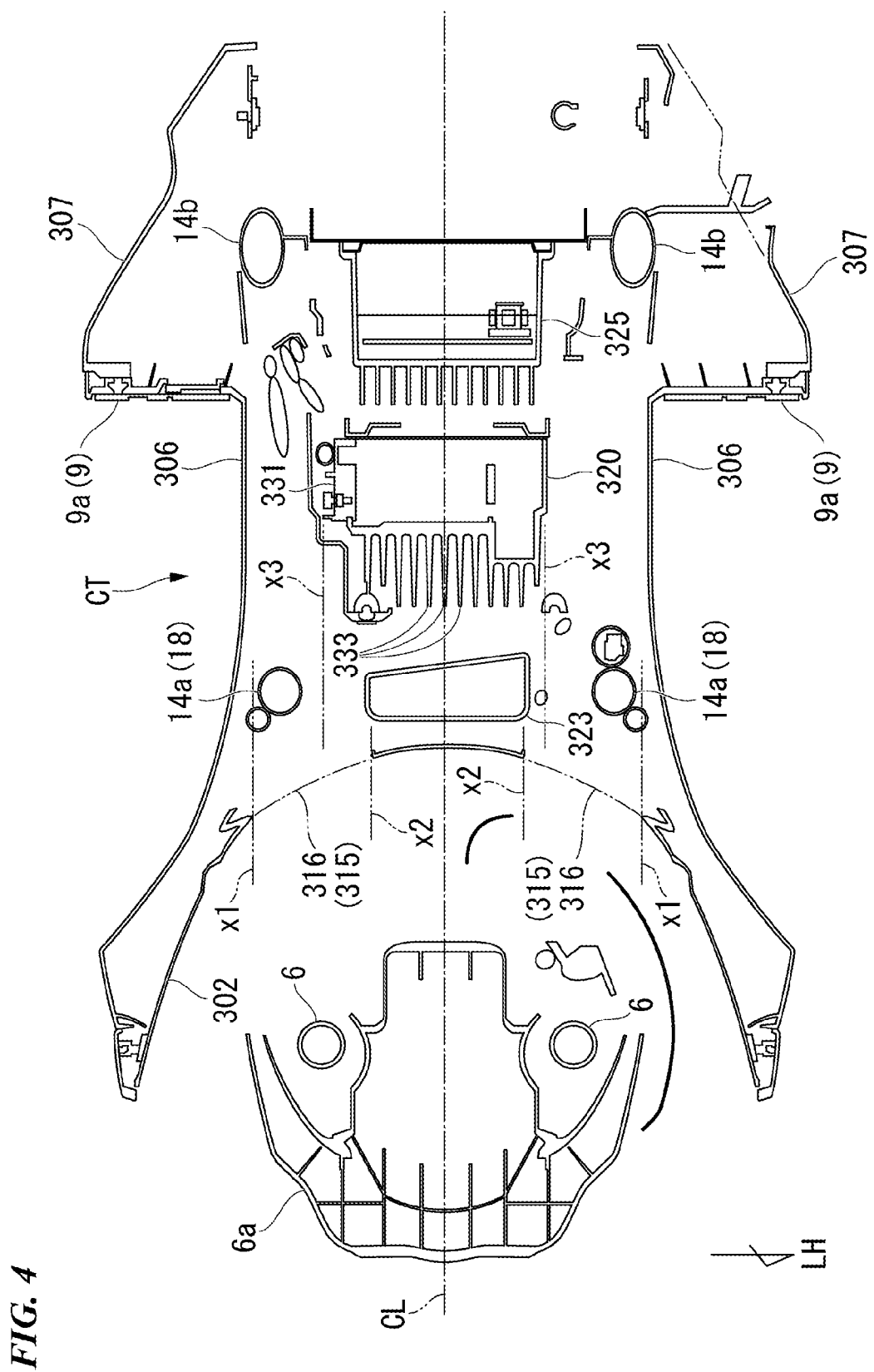
FIG. 4 is a cross-sectional view taken along line IV-IV of FIG. 3.
Figure 5:
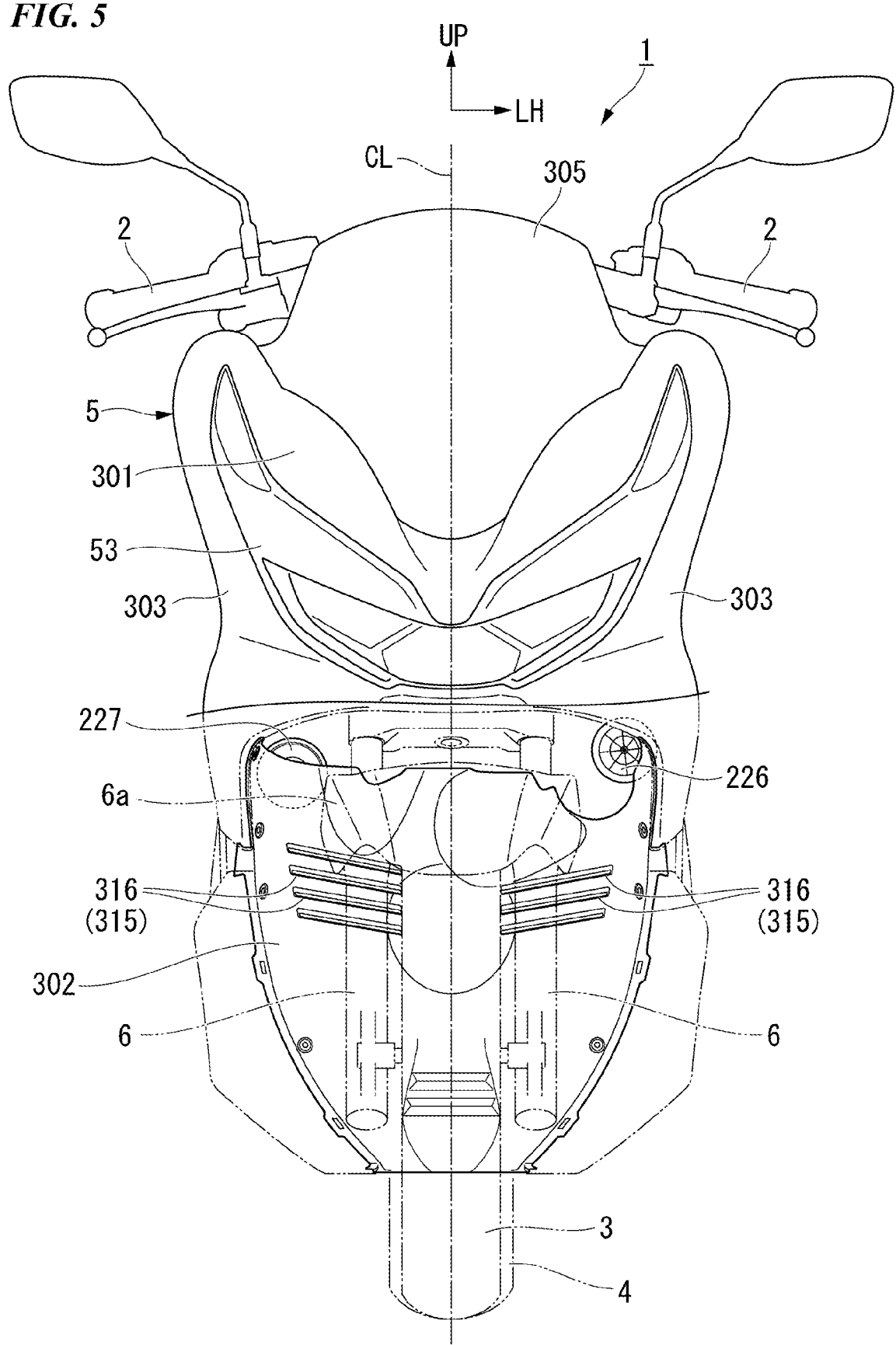
FIG. 5 is a front view of the motorcycle according to the embodiment.

As illustrated in FIGS. 1, 4, and 5, the vehicle body cover 5 includes a front cover 301 which covers an upper portion of the front body FB from the front above the front combination lamp 53, a concave-shaped front lower cover 302 which covers a lower portion of the front body FB from the front below the front combination lamp 53 and behind the front wheel 3, a pair of left and right front side covers 303 which cover left and right portions of the front body FB from an outer lateral side, and an inner cover 304 which covers the upper portion of the front body FB from the rear. The windscreen 305 is attached to an upper portion of the front cover 301 to overlap therewith from the front. An airflow guide hole (airflow guide part) 315 which guides a traveling wind W1 into the center tunnel CT is formed in the front lower cover 302.

The vehicle body cover 5 includes a pair of left and right floor covers 306 which form upper surfaces (floor surfaces 9*a*) of the left and right step floors 9 and cover left and right portions of the center tunnel CT from an outer lateral side, a pair of left and right lower side covers 307 which are continuous with lower sides of the pair of left and right floor covers 306 and cover lower portions of the step floors 9 from an outer lateral side, and an undercover 308 which crosses lower end portions of the left and right lower side covers 307 and covers a lower surface of the vehicle body from below. An opening through which a front portion of the swing unit 10 is inserted to be swingable is formed between rear end portions of the left and right lower side covers 307. This opening constitutes an airflow guide outlet part 309 which discharges the traveling wind W1 introduced into the center tunnel CT from the airflow guide hole 315 to the outside of the center tunnel CT.

The vehicle body cover 5 includes a center cover 311 which covers an upper portion of the center tunnel CT from above, and a pair of left and right rear side covers 312 which cover left and right portions of the rear body RB from an outer lateral side. The rear combination lamp 54 and the grab rail 58 are disposed between rear end portions of the left and right rear side covers 312. A license plate 55, a license lamp 56, and a reflector 57 are disposed on the rear fender 50. The center cover 311 forms the upper surface portion CT1 of the center tunnel CT.

<Swing Unit>

Figure 2:
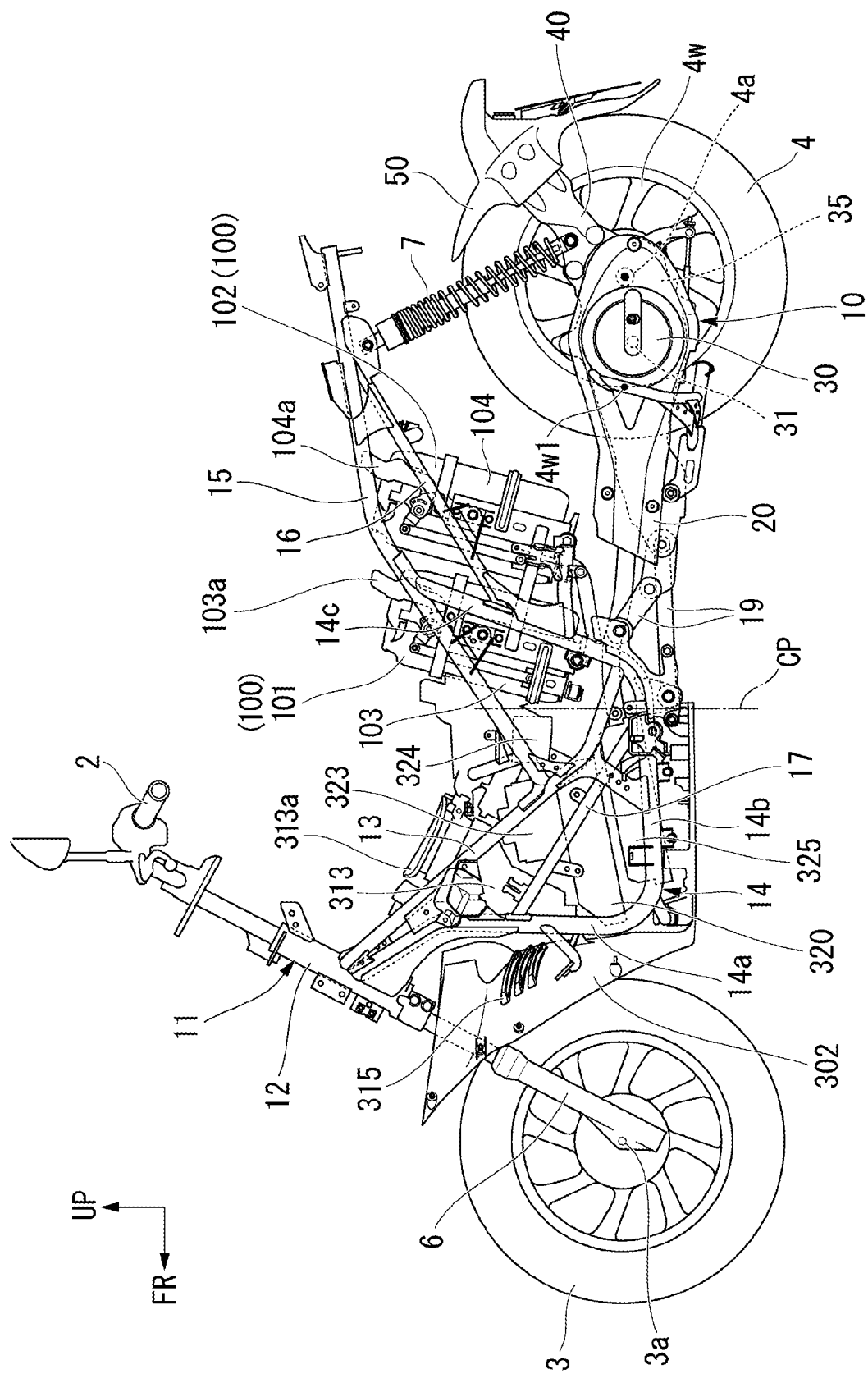
FIG. 2 is a view in which a vehicle body cover or the like is removed from FIG. 1.

As illustrated in FIGS. 1 and 2, the swing unit 10 integrally includes a swing arm 20 whose front end portion is supported by the vehicle body frame 11 via the link mechanism 19 to be vertically swingable, the electric motor 30 disposed on a left side of a rear portion of the swing arm 20 with a drive shaft 31 thereof extended in the left-right direction, and the speed reducer 35 which is continuous with a rear side of the electric motor 30.

The electric motor 30 is driven by electric power of a battery 100. The electric motor 30 is driven at a variable speed by, for example, variable voltage variable frequency (VVVF) control. The electric motor 30 may be transmission controlled such as by having a continuously variable transmission but is not limited thereto and may be transmission controlled such as by having a stepped transmission.

The electric motor 30 is disposed offset to the front of the vehicle with respect to the rear wheel axle 4*a*. The drive shaft 31 of the electric motor 30 is disposed offset to the front of the vehicle with respect to the rear wheel axle 4*a*. The electric motor 30 is disposed substantially between an axial center of the rear wheel axle 4*a* and a front end 4*w*1 of a wheel 4*w* of the rear wheel 4 in the vehicle front-rear direction. The whole of the electric motor 30 is disposed substantially on an inner circumferential side with respect to an outer circumference of the wheel 4*w* (tire inner circumference) of the rear wheel 4 in a side view. The electric motor 30 is provided to protrude outward in the vehicle width direction of a left arm of the swing arm 20 (see FIG. 7).

<Battery>

Figure 6:
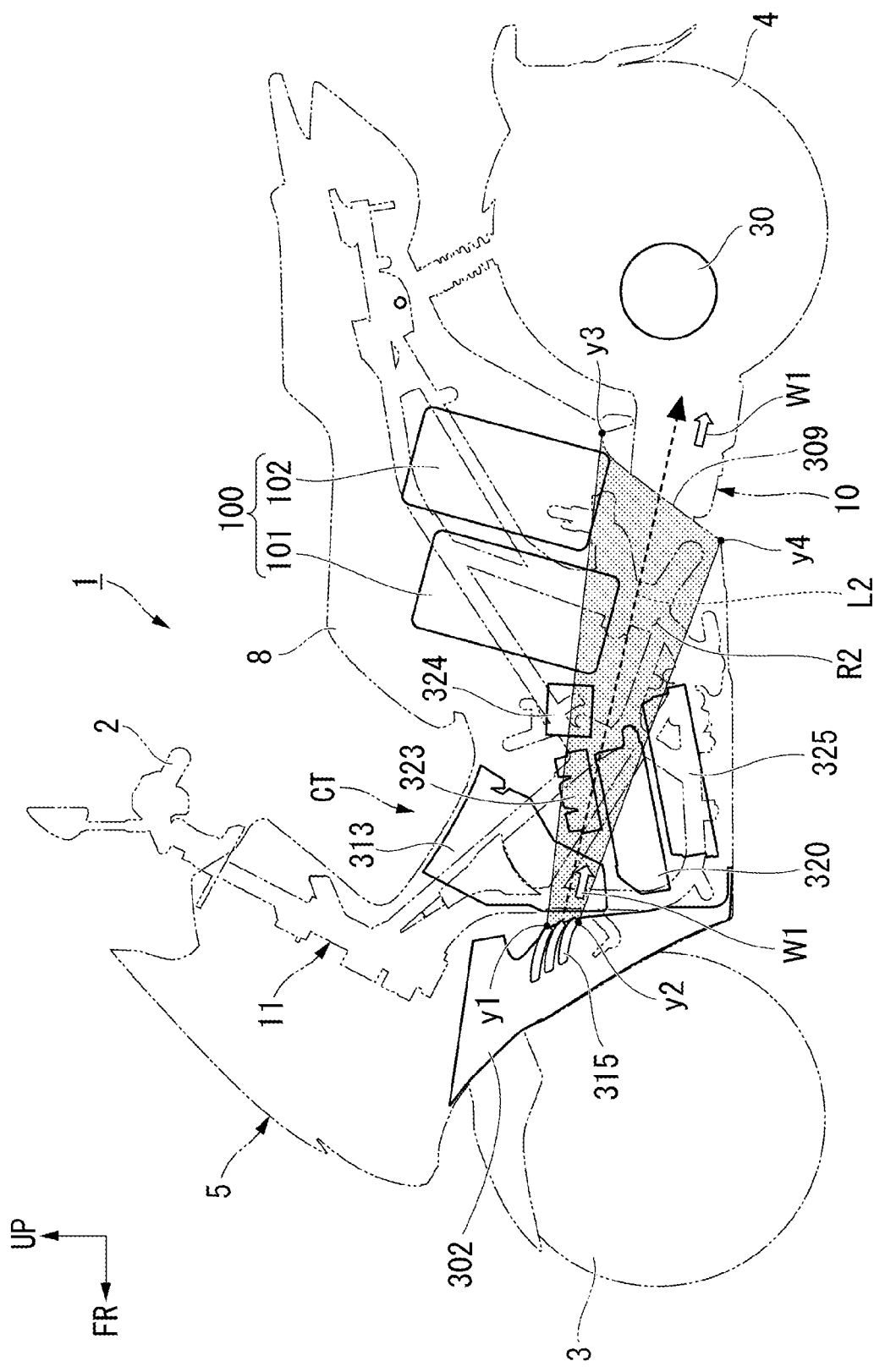
FIG. 6 is a left side view illustrating a disposition of specific components according to the embodiment.

As illustrated in FIGS. 2, 6, and 7, the battery 100 is mounted below the seat 8. The battery 100 is disposed to overlap the seat 8 (particularly the front seat 8*a*) in a plan view. The battery 100 is constituted by a plurality of (for example, two in the front and rear) unit batteries 101 and 102. The plurality of unit batteries 101 and 102 have the same configuration as each other. Hereinafter, the unit batteries 101 and 102 are referred to as a front battery 101 and a rear battery 102, respectively. The front and rear batteries 101 and 102 each have a prismatic shape (rectangular parallelepiped shape) extending in a longitudinal direction with a rectangular cross section (for example, substantially a square shape). The front and rear batteries 101 and 102 are each disposed such that front and rear sides of the cross-sectional shape extend in the left-right direction and left and right sides thereof extend in the front-rear direction. The front and rear batteries 101 and 102 are each disposed in an upright posture of being inclined such that they are positioned further rearward as they are positioned further upward in the longitudinal direction. The front and rear batteries 101 and 102 are inclined parallel to each other and are disposed with a predetermined interval between front and rear surfaces facing each other.

The battery 100 generates a predetermined high voltage (48 to 72 V) due to the front and rear batteries 101 and 102 being connected in series. The front and rear batteries 101 and 102 are each configured by, for example, a lithium ion battery as energy storage that is chargeable and dischargeable.

Figure 16:
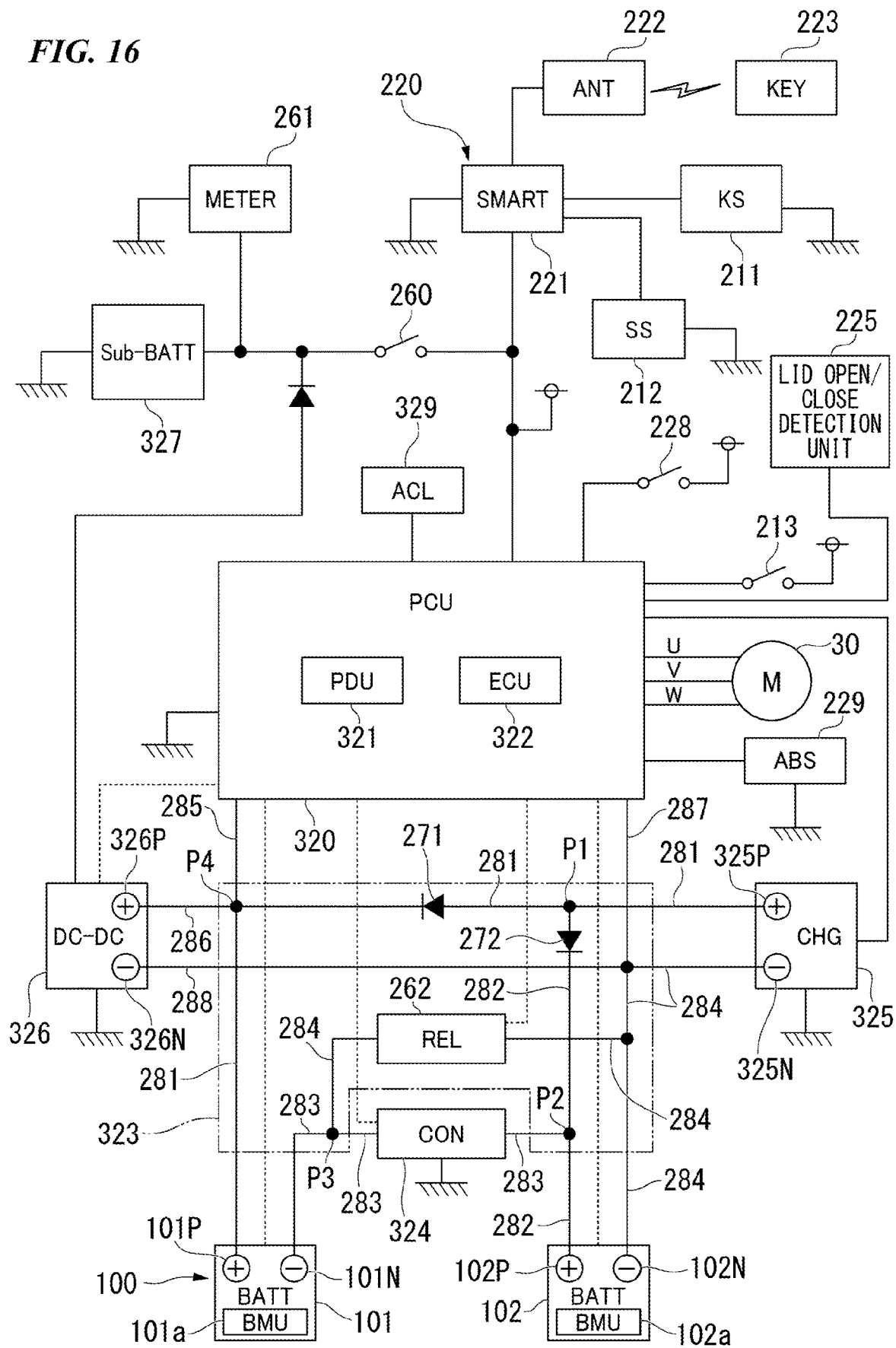
FIG. 16 is a block diagram illustrating a control system of the motorcycle according to the embodiment.

Referring also to FIG. 16, the front and rear batteries 101 and 102 are connected to a power drive unit (PDU) 321 via a junction box (distributor) 323 and a contactor (electromagnetic switch) 324. A three-phase cable 80 extends from the PDU 321, and the three-phase cable 80 is connected to the electric motor 30.

Referring to FIG. 2, the front and rear batteries 101 and 102 are inserted into and removed from front and rear battery cases 103 and 104 fixed to the vehicle body from above. The front and rear battery cases 103 and 104 each have a battery insertion/removal port that opens upward. Lock mechanisms 103a and 104a which restrict upward separation of the front and rear batteries 101 and 102 that have been inserted into the respective cases are provided around the respective battery insertion/removal ports. The front and rear batteries 101 and 102 are obliquely slid into the battery cases 103 and 104 from the battery insertion/removal ports and are stored in the battery cases 103 and 104 so that they can be taken in and out. The front and rear batteries 101 and 102 are obliquely inserted and removed with respect to the battery cases 103 and 104, and thereby some of a weight thereof when the batteries are inserted and removed is supported by rear wall parts of the respective battery cases 103 and 104. The front and rear batteries 101 and 102 are inclined to a side opposite to the hinge shaft at a front end of the seat 8, and thereby insertion and removal of the batteries when the seat 8 is open are facilitated.

Battery-side connection terminals (not illustrated) are provided at lower end portions of the front and rear batteries 101 and 102. Case-side connection terminals (not illustrated) for detachably connecting the battery-side connection terminals are provided on bottom wall parts of the front and rear battery cases 103 and 104. The case-side connection terminals are embedded on a lower side of the bottom wall parts of the front and rear battery cases 103 and 104 before locking operations of the lock mechanisms 103a and 104a. At this time, although the front and rear batteries 101 and 102 can be inserted into and removed from the battery cases 103 and 104, the battery-side connection terminals and the case-side connection terminals are not connected merely by inserting the front and rear batteries 101 and 102 into the battery cases 103 and 104.

When the lock mechanisms 103a and 104a are operated to be locked after the front and rear batteries 101 and 102 are stored in the battery cases 103 and 104, the case-side connection terminals protrude to upper sides of the bottom wall parts of the battery cases 103 and 104. Thereby, the battery-side connection terminals and the case-side connection terminals are connected. The locking operation and terminal connection can be performed for each of the front and rear batteries 101 and 102.

The operation of the lock mechanisms and the insertion and removal of the front and rear batteries 101 and 102 are manually performed, and the front and rear batteries 101 and 102 are attached to and detached from the vehicle body without tools. The front and rear batteries 101 and 102 are attachable to and detachable from the vehicle body with the seat 8 open. The front and rear batteries 101 and 102 are switched between a state of being attachable and detachable and a state of not being attachable and detachable with respect to the vehicle body by opening and closing the seat 8.

The front and rear batteries 101 and 102 are mobile batteries that can be attached to and detached from the vehicle body. The front and rear batteries 101 and 102 can be used singly in such a case as being charged by a charger outside the vehicle or being used as a power supply for an external device as a mobile battery.

The left and right rear frames 14c, the left and right rear upper frames 15, and the left and right rear lower frames 16 are disposed on left and right outer lateral sides of the front and rear batteries 101 and 102 and the battery cases 103 and 104 as a pair of left and right frame members of the vehicle body frame 11. The battery 100 is disposed in a space sandwiched between the pair of left and right frame members (inward sides in the left-right direction of the left and right frame members). The battery 100 is disposed such that at least a portion thereof overlaps the left and right frame members in a side view. Thereby, an influence of disturbances from an outward side in the vehicle width direction with respect to the battery 100 can be reduced.

Referring to FIGS. 6 and 7, the battery 100 is disposed in front of the electric motor 30 in the vehicle front-rear direction. The battery 100 is disposed not to overlap the electric motor 30 in a plan view. The battery 100 is disposed to be shifted in position in the front-rear direction from the electric motor 30 (separated from each other) in a plan view.

The front and rear batteries 101 and 102 are disposed at the same position in the left-right direction as each other. The front and rear batteries 101 and 102 are disposed across the vehicle body left-right center CL from the left and to the right in a plan view. For example, the front and rear batteries 101 and 102 may be configured such that left and right centers thereof coincide with the vehicle body left-right center CL in a plan view. The front and rear batteries 101 and 102 are disposed to be shifted in position in the left-right direction from the electric motor 30 (separated from each other) in a plan view.

<Control System>

As illustrated in FIG. 16, a power driver unit (PDU) 321 and an electric control unit (ECU) 322 constitute a PCU 320 serving as an integrated control unit.

Electric power from the battery 100 is supplied to the PDU 321 serving as a motor driver via the contactor 324 which is linked to a main switch 260. The electric power from the battery 100 is converted from a direct current into a three-phase alternating current by the PDU 321 and then supplied to the motor 30 which is a three-phase alternating current motor.

An output voltage from the battery 100 is stepped down via a direct current-direct current (DC-DC) converter 326 and is used for charging a 12 V sub battery 327. The sub battery 327 supplies electric power to general electrical components such as a lighting device, and control system components such as a meter 261, a smart unit 221, and the ECU 322. When the sub battery 327 is mounted, electromagnetic locks of various types or the like can be operated even when the battery 100 (hereinafter also referred to as "main battery 100") is removed.

Although not illustrated, the PDU 321 includes an inverter having a bridge circuit in which a plurality of switching elements such as transistors are used, smoothing capacitors, and the like. The PDU 321 controls energization for stator winding of the motor 30. The motor 30 performs a power running operation according to control of the PDU 321 to cause the vehicle to travel.

The battery 100 is charged by a charger 325 connected to an external power supply in a state in which it is mounted on the vehicle body. The battery 100 (the front and rear batteries 101 and 102) can be charged by a charger outside the vehicle in a state in which it is removed from the vehicle body.

The front and rear batteries 101 and 102 respectively include battery managing units (BMUs) 101a and 102a which monitor a charge/discharge status, a temperature, or the like. Information monitored by the BMUs 101a and 102a is shared with the ECU 322 when the front and rear batteries 101 and 102 are mounted on the vehicle body. Output request information from an accelerator sensor 329 is input to the ECU 322. The ECU 322 controls driving of the motor 30 via the PDU 321 on the basis of the output request information that has been input.

For example, the ECU 322 may regulate charging/discharging of the battery 100 by controlling the battery 100. For example, the ECU 322 may switch between supplying electric power to the battery 100 and discharging from the battery 100 by controlling the contactor 324 and a relay 262.

A first diode 271 rectifies a current flowing between a high potential side terminal 325P of the charger 325 and a high potential side terminal 101P of the front battery 101. For example, the first diode 271 may cause a current to flow in a direction from the high potential side terminal 325P of the charger 325 toward the high potential side terminal 101P of the front battery 101.

A second diode 272 rectifies a current flowing between the high potential side terminal 325P of the charger 325 and a high potential side terminal 102P of the rear battery 102. For example, the second diode 272 may cause a current to flow in a direction from the high potential side terminal 325P of the charger 325 toward the high potential side terminal 102P of the rear battery 102.

The current flowing through the first diode 271 and the current flowing through the second diode 272 are different from each other. Polarities of the high potential side terminal 325P of the charger 325, the high potential side terminal 101P of the front battery 101, and the high potential side terminal 102P of the rear battery 102 are the same polarity. For example, polarities of the high potential side terminal 325P of the charger 325, the high potential side terminal 101P of the front battery 101, and the high potential side terminal 102P of the rear battery 102 are positive.

The first diode 271 that corresponds to the front battery 101 and the second diode 272 that corresponds to the rear battery 102 are provided to protect respective parts from the following events.

When the first diode 271 and the second diode 272 are provided, backflow of currents from each of the high potential side terminal 101P of the front battery 101 and the high potential side terminal 102P of the rear battery 102 to the high potential side terminal 325P of the charger 325 is prevented.

When the first diode 271 is provided, the front battery 101 is prevented from being short-circuited in a case in which the battery 100 is connected in series.

In a conductor 281 and a conductor 282 that connect the high potential side terminal 101P of the front battery 101 and the high potential side terminal 102P of the rear battery 102, when the first diode 271 and the second diode 272 are provided in opposite directions to each other, in a case in which a short-circuiting failure occurs at one of the front battery 101 and the rear battery 102, short-circuiting on the other is prevented.

The contactor 324 connects or disconnects a connection between a low potential side terminal 101N of the front battery 101 and the high potential side terminal 101P of the rear battery 102. For example, the contactor 324 may connect the low potential side terminal 101N of the front battery 101 and the high potential side terminal 102P of the rear battery 102 in a conductive state. The contactor 324 connects the battery 100 in series in a conductive state and disconnects the serial connection of the battery 100 in a cut-off state. A period in which the contactor 324 is in a cut-off state includes at least a period in which the charger 325 supplies electric power to the battery 100.

The relay 262 connects or disconnects a connection between the low potential side terminal 101N of the front battery 101 and a low potential side terminal 102N of the rear battery 102. For example, the relay 262 may connect the low potential side terminal 101N of the front battery 101 and the low potential side terminal 102N of the rear battery 102 in a conductive state. A period in which the relay 262 is in a conductive state includes at least a period in which the charger 325 supplies electric power to the battery 100.

Opposite ends of the battery 100 connected in series are connected to the PDU 321. The front battery 101 and the rear battery 102 in the battery 100 are connected in series or in parallel by switching states of the contactor 324 and the relay 262. The contactor 324, the relay 262, the first diode 271, and the second diode 272 are examples of connection switching devices. The diodes 271 and 272, the relay 262, and connection parts (branch points P1 to P4) are included in the junction box 323.

<Example of Connection Configuration of Electrical Circuit Drive System>

Respective parts of the electrical circuit drive system are electrically connected as follows by conductors (lead wires) including a first conductor 281, a second conductor 282, a third conductor 283, a fourth conductor 284, a fifth conductor 285, a sixth conductor 286, a seventh conductor 287, and an eighth conductor 288.

The high potential side terminal 101P of the front battery 101 and the high potential side terminal 325P of the charger 325 are electrically connected by the first conductor 281. The first diode 271 is inserted into the first conductor 281. For example, a cathode of the first diode 271 may be connected to the high potential side terminal 101P of the front battery 101, and an anode of the first diode 271 may be connected to the high potential side terminal 325P of the charger 325. The first branch point P1 is provided between the anode of the first diode 271 and the high potential side terminal 325P of the charger 325.

The first branch point P1 and the high potential side terminal 102P of the rear battery 102 are electrically connected by the second conductor 282. The second diode 272 is inserted into the second conductor 282. For example, a cathode of the second diode 272 may be connected to the high potential side terminal 102P of the rear battery 102, and an anode of the second diode 272 may be connected to the high potential side terminal 325P of the charger 325 via the first branch point P1. The second branch point P2 is provided between the cathode of the second diode 272 and the high potential side terminal 102P of the rear battery 102.

The second branch point P2 and the low potential side terminal 101N of the front battery 101 are electrically connected by the third conductor 283. A contact of the contactor 324 is inserted into the third conductor 283. The third branch point P3 is provided in the third conductor 283. A position of the third branch point P3 is between the contactor 324 and the low potential side terminal 101N of the front battery 101.

The third branch point P3 and a low potential side terminal 325N of the charger 325 are electrically connected by the fourth conductor 284. A contact of the relay 262 is inserted into the fourth conductor 284.

The low potential side terminal (102N) of a lower potential side battery (the rear battery 102) among the batteries connected in series and the low potential side terminal 325N of the charger 325 are electrically connected by the fourth conductor 284.

The fourth branch point P4 is provided between the cathode of the first diode 271 and the high potential side terminal 101P of the front battery 101.

The fourth branch point P4 and a high potential side terminal of the PDU 321 are electrically connected by the fifth conductor 285.

The fourth branch point P4 and a high potential side terminal 326P of the DC-DC converter 326 are electrically connected by the sixth conductor 286.

A low potential side terminal of the PDU 321 is connected to the low potential side terminal 325N of the charger 325 by the seventh conductor 287.

A low potential side terminal 326N of the DC-DC converter 326 is connected to the low potential side terminal 325N of the charger 325 by the eighth conductor 288.

The electrical circuit may include connections of a monitoring control system indicated by a broken line in the drawing in addition to the connections of the drive system described above. The electrical circuit may include the ECU 322.

<Operation of Electrical Circuit>

The ECU 322 acquires a state of the battery 100 from the respective BMUs 101a and 102a. The ECU 322 detects an operation of a user from the accelerator sensor 329 or the like. The ECU 322 controls the contactor 324, the relay 262, and the PDU 321 on the basis of collected information.

For example, when the battery 100 is charged with electric power from the charger 325, the ECU 322 may perform control such that the contactor 324 is in a cut-off state and the relay 262 is in a conductive state. When the front battery 101 and the rear battery 102 are in a state of being connected in parallel, electric power from the charger 325 is supplied to the front battery 101 and the rear battery 102. In a case of the control state described above, this is in a state in which electric power from the charger 325 can be supplied to the PDU 321. A voltage from the charger 325 to the PDU 321 is the same as a voltage applied between the terminals of the front battery 101.

For example, when the PDU 321 is driven with electric power accumulated in the battery 100, the ECU 322 may perform control such that the contactor 324 in a conductive state and the relay 262 is in a cut-off state. When the front battery 101 and the rear battery 102 are in a state of being connected in series, the front battery 101 and the rear battery 102 supply electric power to the PDU 321. In a case described above, the first diode 271 is reverse-biased. Due to the reverse bias described above, a voltage (for example, 96 V) of the high potential side terminal 101P of the front battery 101 is not applied to the high potential side terminal 102P of the rear battery 102 and the high potential side terminal 325P of the charger 325.

<ABS>

An anti-lock brake system (ABS) 229 is electrically connected to the PCU 320. When drive wheels are locked at the time of sudden braking or the like, the ABS 229 has functions of automatically repeating release and operation of a brake even while the brake remains applied to restore a tire grip force and maintaining traveling stability of the vehicle. The ABS 229 also functions as a vehicle state detection unit capable of detecting a traveling state and a stopped state of the vehicle. For example, the ABS 229 includes a wheel speed sensor (not illustrated) that can detect a wheel speed.

<Operation of PCU>

The PCU 320 also functions as a control unit that controls the vehicle on the basis of detection results of a lid open/close detection unit 225 and the ABS 229.

When the ABS 229 detects a stopped state of the vehicle and the lid open/close detection unit 225 detects an open state of a lid 313a (see FIG. 1), the PCU 320 prohibits traveling of the vehicle.

When the ABS 229 detects a traveling state of the vehicle and the lid open/close detection unit 225 detects an open state of the lid 313a, the PCU 320 prohibits traveling of the vehicle after the vehicle has stopped.

Here, the stopped state of the vehicle includes not only a state in which the vehicle is completely stopped but also a state in which the vehicle is substantially stopped (a state in which the vehicle is moving slightly). For example, when a vehicle speed is V, the stopped state of the vehicle includes a state in a range of 0 km/h≤V≤5 km/h.

<Operation of PCU as Lock Control Unit>

The motorcycle includes a smart system 220 (vehicle electronic lock) which enables the vehicle to be locked and unlocked, the PCU 320 which is a lock control unit that controls the smart system 220, and the sub battery 327 which supplies electric power to the PCU 320.

The smart system 220 enables the vehicle to be locked and unlocked by authentication with a remote key 223 (portable device).

The smart system 220 includes the smart unit 221 connected to the PCU 320, an antenna 222 connected to the smart unit 221, a lock knob 211 (handle lock part) connected to the smart unit 221, and a seat switch 212 (lid lock part) connected to the smart unit 221.

The smart unit 221 is a control unit including a microcomputer.

The antenna 222 is a transmitting/receiving antenna for performing communication with the remote key 223.

The lock knob 211 enables the handle 2 (see FIG. 1) to be locked and unlocked.

The seat switch 212 enables the seat 8 (see FIG. 1) that is a storage lid for storing the battery 100 to be locked and unlocked.

The PCU 320 enables the vehicle to be unlocked with the battery 100 removed from the vehicle. The PCU 320 controls the smart unit 221 on the basis of an authentication result with the remote key 223.

As illustrated in FIG. 16, the remote key 223 communicates with the smart unit 221 and transmits identification (ID) information. For example, the remote key 223 includes a transmitting/receiving circuit (not illustrated) to which a plurality of antennas for enabling omnidirectional communication (transmission and reception) are connected, an electrically erasable programmable read-only memory (EEPROM, not illustrated) as a storage device for storing data of various types, and a central processing unit (CPU) which controls components of the remote key 223. A power supply such as a lithium battery for driving the remote key 223 may be incorporated in the remote key 223.

For example, when the remote key 223 is brought into an authentication area set in the vehicle in a state in which the transmitting/receiving circuit of the remote key 223 is active, the entire system of the smart system 220 operates. The smart system 220 does not operate when the transmitting/receiving circuit of the remote key 223 is in a stopped state.

For example, when the remote key 223 is taken out of the authentication area, the smart system 220 is in an initial state and each lock device is locked.

<Operations of Switches of Various Types or the Like>

Referring to FIG. 16, operations of switches of various types will be described.

For example, the smart unit 221 may be supplied with power from the sub battery 327 when the main switch 260 is turned on.

For example, when the main switch 260 and the start switch 228 are turned on, the sub battery 327 is charged by the main battery 100 through the DC-DC converter 326.

When the main switch 260 is ON, the smart unit 221 is supplied with power from the sub battery 327 regardless of presence or absence of the main battery 100. Therefore, the smart unit 221 can be operated by the sub battery 327 without the main battery 100.

When the main switch 260 is ON, the smart unit 221 is charged by the main battery 100 through the DC-DC converter 326.

The PCU 320 detects a state of a lid switch 213. The PCU 320 controls the vehicle on the basis of an open/closed state of the lid 313a.

For example, when an open state of the lid 313a is detected before the vehicle travels, the PCU 320 performs control such that a driving force is not generated regardless of an input from the accelerator sensor 329.

Thereby, the vehicle can be prevented from starting to travel with the lid 313a open.

For example, when the open state of the lid 313a is detected while the vehicle is traveling, the PCU 320 may perform control of generating a driving force corresponding to the accelerator sensor 329 until a vehicle speed reaches substantially zero. For example, the vehicle speed can be obtained from the ABS 229 connected to the PCU 320.

The vehicle speed is not limited to being obtained from the ABS 229 and may be obtained from a global positioning system (GPS) or other devices for detecting a vehicle speed.

For example, when the vehicle speed reaches substantially zero or the vehicle is in a stopped state, the PCU 320 performs control such that a driving force is not generated regardless of an input from the accelerator sensor 329.

Thus, even when it is assumed that the lid 313a (see FIG. 1) is open during travel, the lid 313a can be closed after the vehicle is moved to a safe location and stopped.

A notification device such as a light emitting diode (LED) indicator (not illustrated) that is changed according to an open/closed state of the lid 313a (see FIG. 1) may be provided in the meter 261. Due to the LED indicator that is visually recognized, the open/closed state of the lid 313a (see FIG. 1) can be ascertained even during travel.

<Control System Components>

As illustrated in FIGS. 2, 3, and 6, the PCU 320 is disposed on an inward side of the center tunnel CT together with the junction box 323, the contactor 324, and the charger 325. The PCU 320, the junction box 323, the contactor 324, and the charger 325 are disposed in front of a center position CP (see FIG. 2) between the front and rear wheels 3 and 4 in the vehicle front-rear direction. The battery 100 is disposed behind the center position CP between the front and rear wheels 3 and 4. Thereby, a weight balance of the control system components in the vehicle front-rear direction is improved. When the PCU 320 is disposed on a spring of a suspension, an unsprung weight is reduced compared to a case in which, for example, the PCU 320 is disposed under a rear suspension spring together with the electric motor 30.

Figure 11:
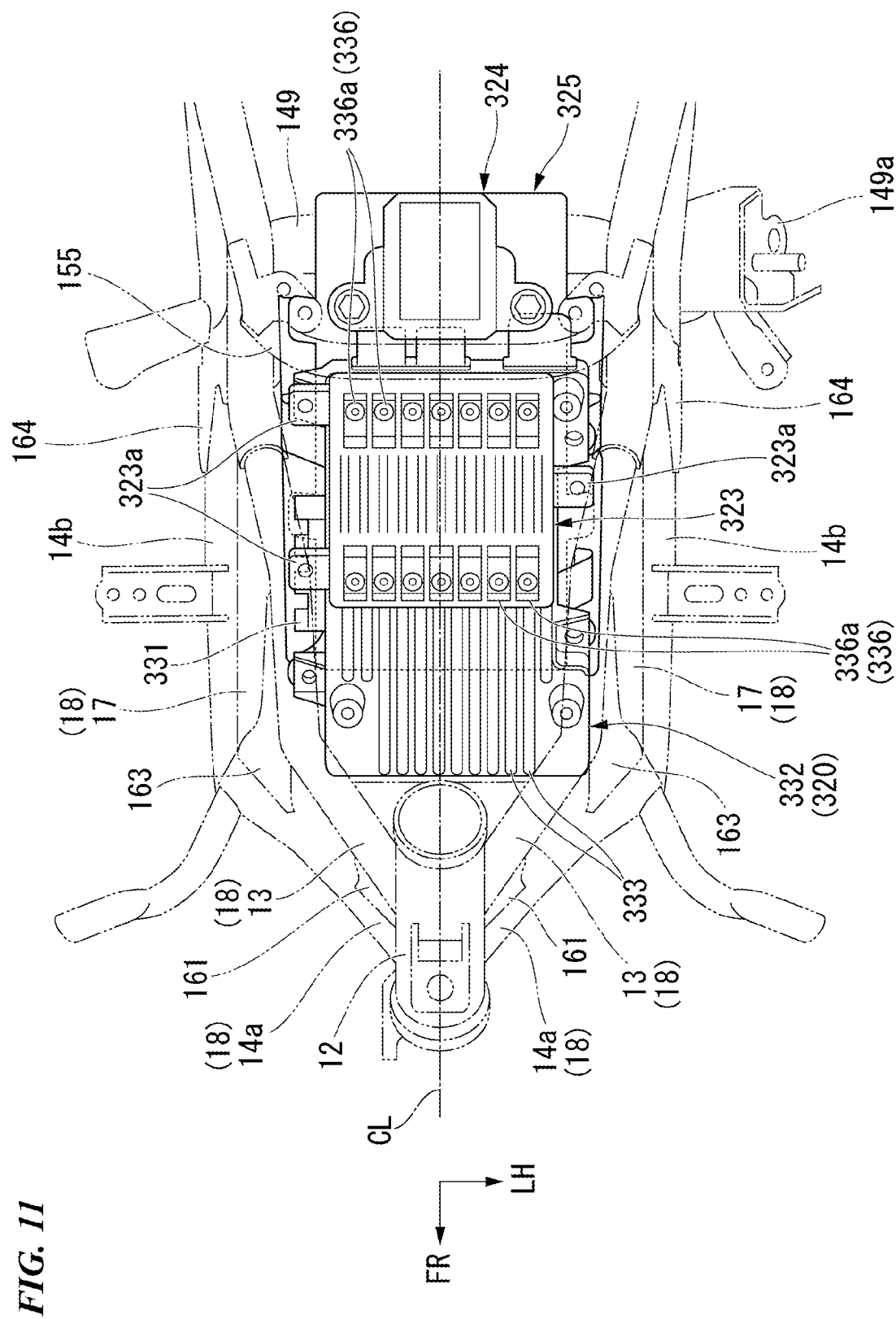
FIG. 11 is a top view illustrating a component disposition around a power control unit (PCU) according to the embodiment.
Figure 12:
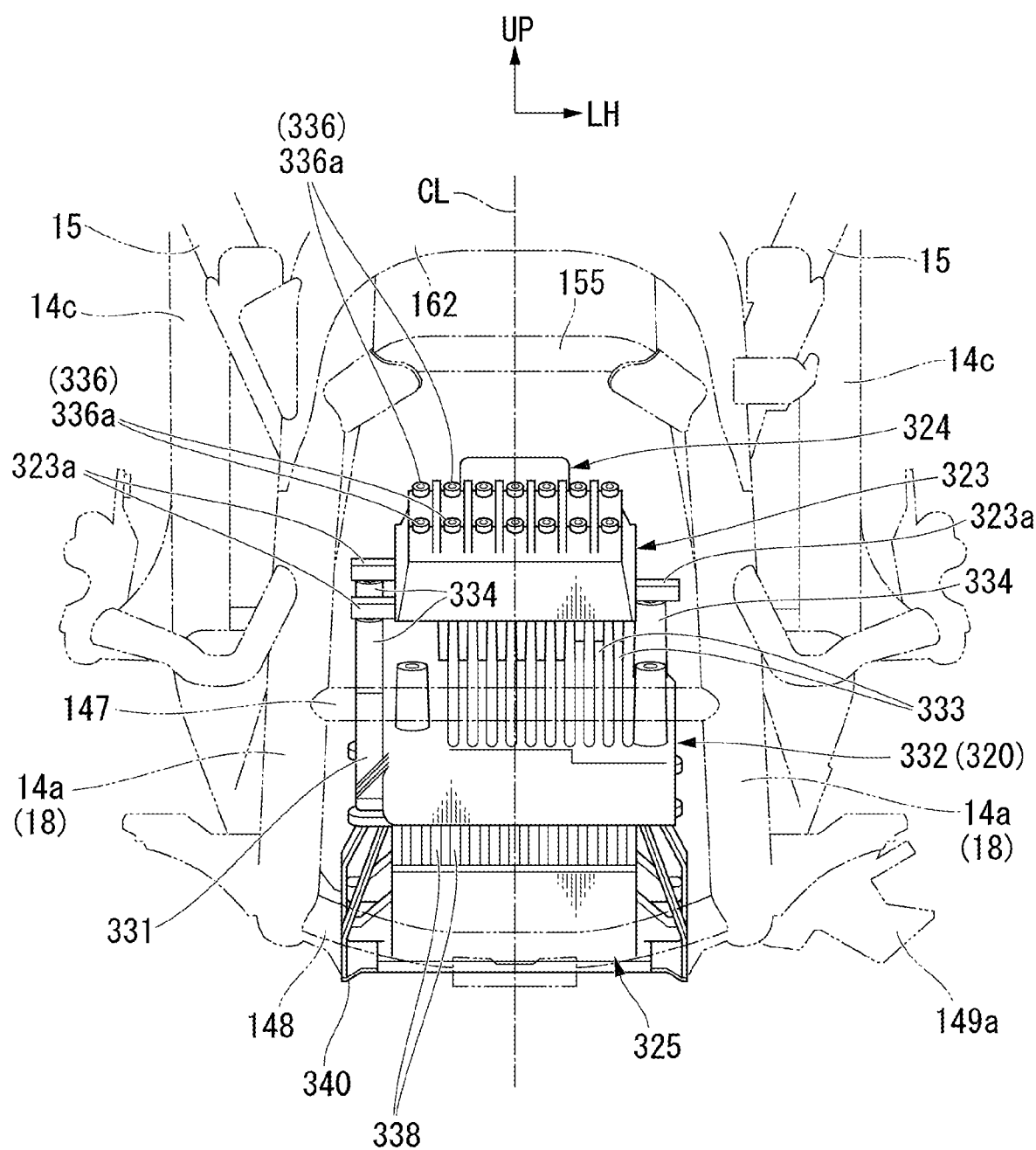
FIG. 12 is a front view illustrating a component disposition around the PCU according to the embodiment.

Referring to FIGS. 11 and 12 together, the PCU 320 includes a flat box-shaped housing 332 of which a vertical thickness is reduced. The housing 332 may be formed of, for example, an aluminum alloy. The housing 332 has a rectangular shape in a plan view and is disposed such that front and rear sides extend in the left-right direction and left and right sides extend in the front-rear direction. A plurality of heat-dissipation fins 333 extending in the vehicle front-rear direction are provided to stand upright on an upper surface of the housing 332. The PCU 320 uses an upper surface portion of the housing 332 as a heat sink.

The PCU 320 has a two-layer structure in which a control board constituting the ECU 322 and a high-voltage board constituting the PDU 321 overlap in a thickness direction in the housing 332. The high-voltage board constitutes an upper layer, and the control board constitutes a lower layer. When the PDU 321 is the upper layer, an influence of disturbances on the PDU 321 from below can be reduced compared to a case in which the PDU 321 is the lower layer.

Figure 13:
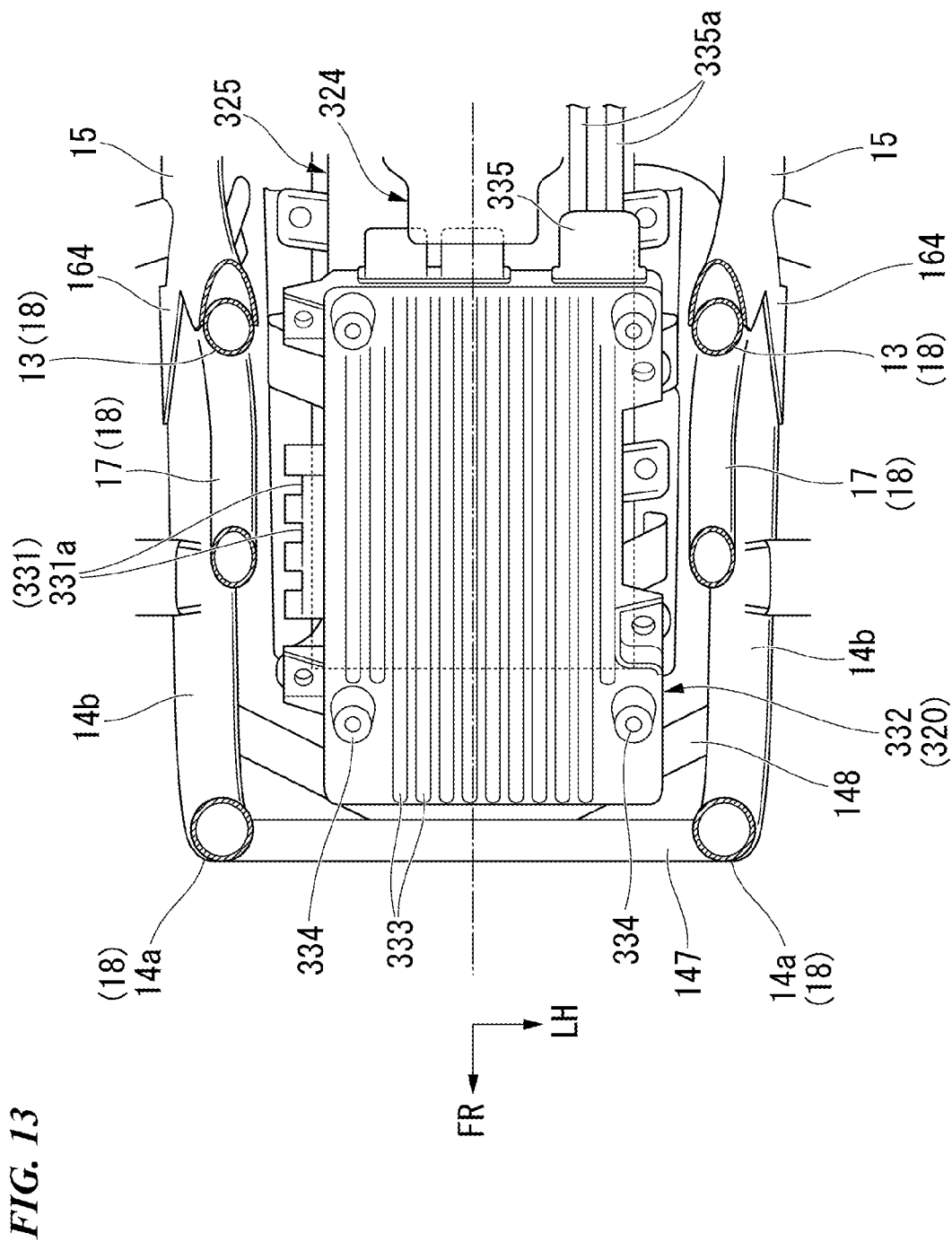
FIG. 13 is a top view including a partial cross section with a junction box removed from FIG. 11.
Figure 14:
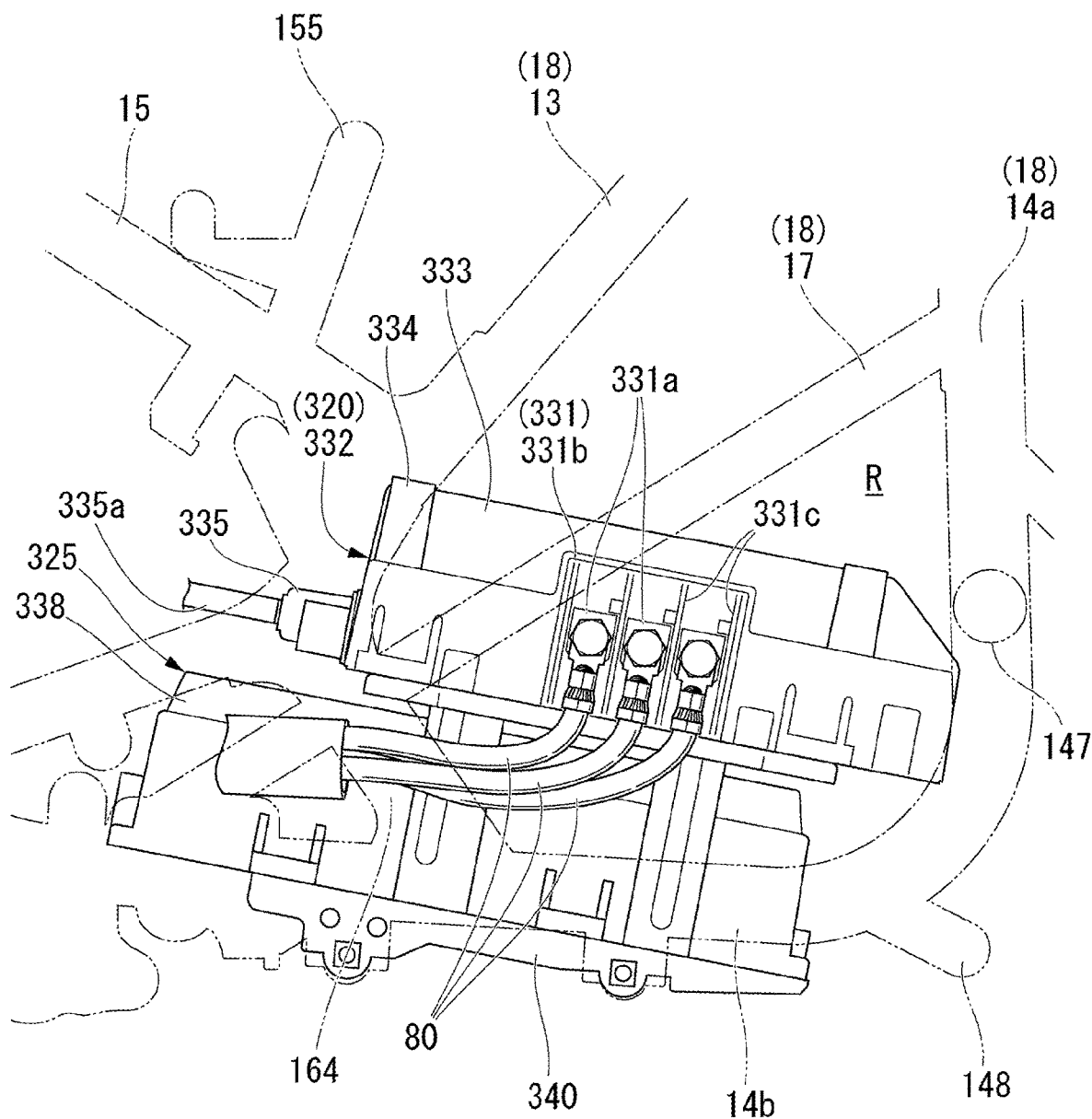
FIG. 14 is a right side view of FIG. 13.
Figure 14:
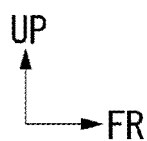
Figure 15:
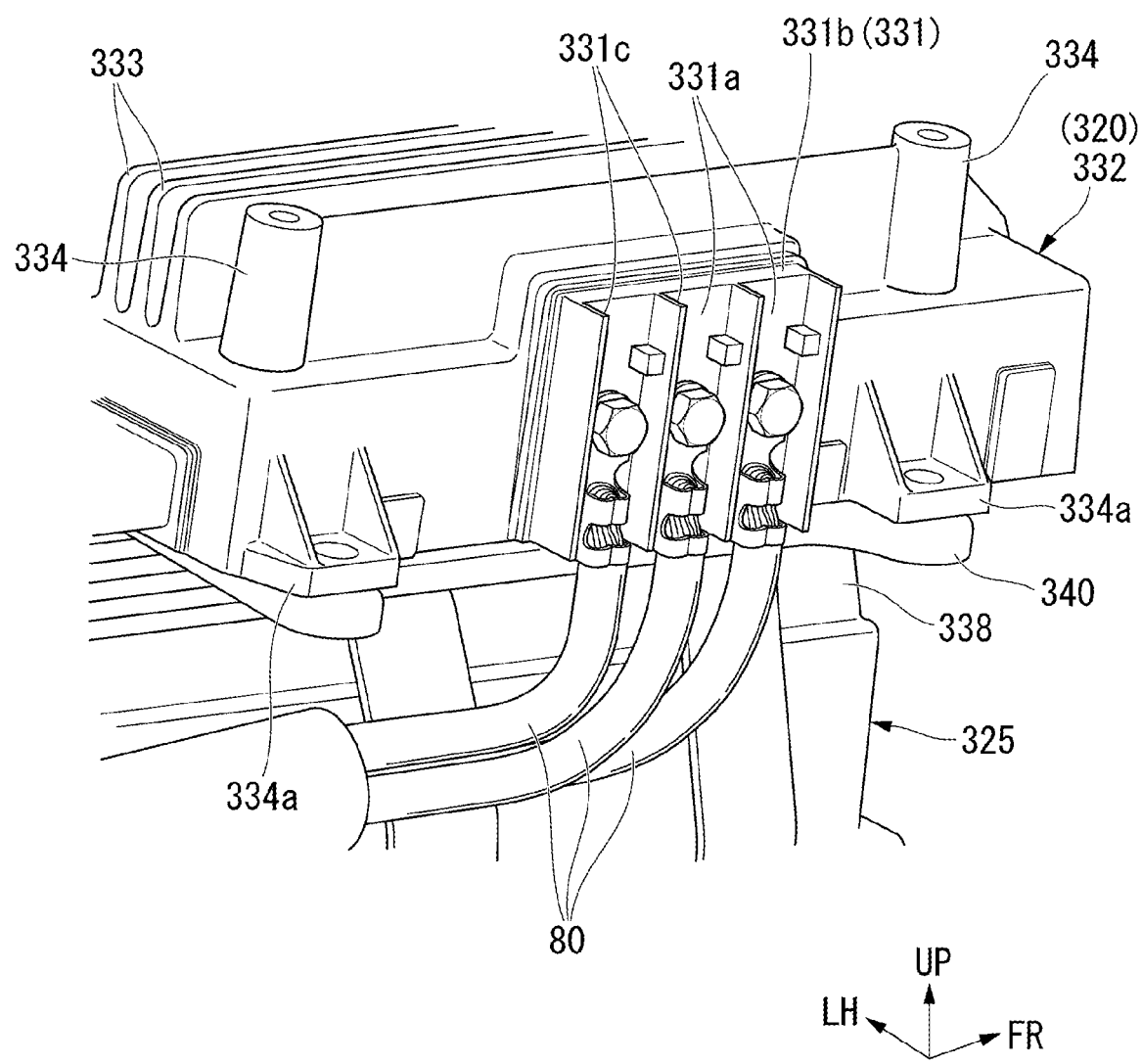
FIG. 15 is a perspective view of the surroundings of a terminal block of the PCU of FIG. 14 when viewed from above and from the right.

Referring to FIGS. 13 to 15 together, a terminal block 331 for connecting the three-phase cable 80 to the high-voltage board is provided on a right side surface of the housing 332. Terminal connection parts 331a for three phases are provided to be aligned in the front-rear direction of the housing 332 on the terminal block 331. Terminals of one end of the three-phase cable 80 are respectively connected to the terminal connection parts 331a by bolt fastening. Since the terminal block 331 is provided on a side surface of the PCU 320, handleability and attaching/detaching workability of the three-phase cable 80 are improved. An output cable 335a reaching the contactor 324 is connected to a rear end portion of the PCU 320 via a connector 335.

The three-phase cable 80 is an aggregate cable bundled into a single cable on a right side of the PCU 320 and traverses the vehicle body obliquely from the right side to the left side in the vicinity of a front end portion of the swing unit 10. The three-phase cable 80 extends rearward on a left side of the swing unit 10, and the other end thereof is connected to the electric motor 30. The three-phase cable 80 is disposed not to overlap the housing 332 and ribs 331c in a side view.

The terminal block 331 is disposed on an inward side in the left-right direction of the right down frame part 18. The terminal block 331 is disposed in a region R1 surrounded by the frame members in a side view. The terminal block 331 is disposed at a portion avoiding the frame members in a side view. The terminal block 331 includes a base 331b made of an insulating member. The base 331b includes the ribs (upright walls) 331c that partition a plurality of terminal connection parts 331a. Since the terminal block 331 is disposed in the region R1 surrounded by the frame members in a side view, even when the right down frame part 18 is deformed by an impact from a side surface of the vehicle, the frame members does not easily come into contact with the terminal block 331.

The PCU 320 is disposed across the vehicle body left-right center CL from the left and to the right in a plan view. On the left and right outward sides of the PCU 320, the left and right down frames 14a, the left and right upper frames 13, and the left and right middle frames 17 (the left and right down frame parts 18) are disposed as the pair of left and right frame members of the vehicle body frame 11. The PCU 320 is disposed in a space (inward side in the left-right direction of the left and right down frame parts 18) sandwiched between the pair of left and right frame members (the down frame parts 18). The PCU 320 is disposed such that at least a portion thereof overlaps the left and right down frame parts 18 in a side view. Thereby, an impact load input to the PCU 320 in an impact from a side surface of the vehicle can be reduced. That is, an influence of disturbances from a lateral side of the vehicle on the PCU 320 is reduced, and the PCU 320 can be better protected.

Referring to FIG. 7, the PCU 320 is disposed in front of the battery 100 in the vehicle front-rear direction. The PCU 320 is disposed to be separated from the battery 100 and the electric motor 30 so that they do not overlap each other in a plan view. Thereby, the PCU 320, the battery 100, and the electric motor 30 which are heat generating components during travel are disposed to be appropriately distributed in the vehicle front-rear direction. Therefore, increase in temperature of the PCU 320, the battery 100, and the electric motor 30 can be curbed.

Referring to FIG. 3, the PCU 320 is disposed above the lower frame 14b. Thereby, even when a lower portion of the vehicle body comes into contact with an obstacle or the like below the vehicle, the PCU 320 can be protected from an impact to the PCU 320 from below (road surface side) by the lower frame 14b. The PCU 320 is disposed above the floor surfaces 9a of the step floors 9. Thereby, further road clearance for the PCU 320 is gained and flooding with water is inhibited.

The PCU 320 is disposed below the lowest portion CT2 of the center tunnel CT. The PCU 320 is disposed below a lower end portion of the head pipe 12. The PCU 320 is disposed in a height range H1 between an axial center of a front wheel axle 3a and an upper end 3w1 of a wheel 3w in the vertical direction in a side view. When an upper limit of the disposition height of the PCU 320 is set, heightening in center of gravity position of the motorcycle 1 is minimized, and an increase in length of the three-phase cable 80 is also minimized The PCU 320 is disposed to be inclined downward toward the front in a side view. A front lower end (lowermost end) T1 of the PCU 320 is positioned at substantially the same height as the front wheel axle 3a. A rear upper end (uppermost end) T2 of the PCU 320 is positioned below the upper end 3w1 of the wheel 3w of the front wheel 3.

Referring to FIGS. 6 and 7, the motorcycle 1 includes the seat 8 above and behind the center tunnel CT and the rear wheel 4 below and behind the seat 8. The PCU 320 is disposed to overlap the center tunnel CT in a plan view, and the battery 100 is disposed to overlap the seat 8 in a plan view. The electric motor 30 is disposed to be wrapped around by the rear wheel 4 in a position in the front-rear direction and shifted from the battery 100 in a position in the front-rear direction.

Thereby, the PCU 320, the battery 100, and the electric motor 30 which are heat generating components during travel are disposed to be appropriately distributed in the vehicle front-rear direction and the vertical direction, and a mutual thermal influence (increase in temperature) between the PCU 320, the battery 100, and the electric motor 30 can be reduced.

The traveling wind W1 introduced into the center tunnel CT from the airflow guide hole 315 of the front lower cover 302 is supplied to an upper surface portion of the PCU 320. The traveling wind W1 is efficiently taken into the center tunnel CT through the airflow guide hole 315 facing the front of the vehicle. Thereby, while the PCU 320, the junction box 323, and the contactor 324, which are heat generating components during travel, are disposed in the center tunnel CT, a cooling performance of these heat generating components is secured. Since the heat generating components are disposed in front of the battery 100, a cooling performance of the heat generating components due to the traveling wind W1 is improved.

Referring to FIG. 5, a pair of left and right airflow guide holes 315 are provided to avoid the front wheel 3 in a front view. The left and right airflow guide holes 315 are each formed such that a plurality of slit-shaped openings 316 extending in the left-right direction are aligned in the vertical direction. For example, the left airflow guide hole 315 has three-stage openings 316 vertically, and the right airflow guide hole 315 has four-stage openings 316 vertically. The airflow guide holes 315 are positioned below the upper end of the front wheel 3. An airflow guide part such as a notch or a gap may be used instead of the airflow guide holes 315 as long as traveling wind can be introduced into the center tunnel CT.

Referring to FIG. 3, hoods 317 that change a flow of the traveling wind W1 having passed through the openings 316 downward are formed on a back side (rear side) of the front lower cover 302. The PCU 320 is disposed below the airflow guide holes 315 behind the front lower cover 302. The traveling wind W1 that has passed through the openings 316 and has been guided downward by the hoods 317 is supplied to the upper surface portion (the heat-dissipation fins 333) of the PCU 320. A region R2 indicated by hatching in FIG. 6 illustrates an airflow guide path region through which the traveling wind W1 is caused to flow in the center tunnel CT. The airflow guide path region R2 is a region sandwiched between lines connecting upper and lower ends y1 and y2 of the airflow guide holes 315 and upper and lower ends y3 and y4 of the airflow guide outlet part 309 in a side view. A line L2 in the drawing indicates a passage center line that vertically bisects the airflow guide path region R2 in a side view.

The PCU 320 is disposed in a posture in which the upper surface portion perpendicular to a thickness direction is inclined downward toward the front. Thereby, the traveling wind W1 introduced from the airflow guide holes 315 can be easily applied to the upper surface portion of the PCU 320 having the heat-dissipation fins 333, and thus a cooling performance of the PCU 320 is improved.

An extension line L1 in which upper edges of the heat-dissipation fins 333 are extended toward the rear of the vehicle overlaps the battery 100 in a side view. Therefore, the traveling wind W1 that has flowed along the heat-dissipation fins 333 flows toward the battery 100 on the extension line L1 and is also used for cooling the battery 100. The traveling wind W1 that has flowed around the battery 100 from the center tunnel CT is discharged from a rear lower portion of the rear body RB (the airflow guide outlet part 309) toward a periphery of the rear wheel 4.

Referring to FIG. 4, end portions x1 on an outward side in the left-right direction of the left and right airflow guide holes 315 are formed on an outward side in the left-right direction of the down frame parts 18 when viewed from the vehicle front-rear direction. Thereby, at least some of the traveling wind W1 introduced into the center tunnel CT from the left and right airflow guide holes 315 flows through the outward side in the left-right direction of the down frame parts 18. Therefore, a flow velocity of air in the center tunnel CT is improved, and the swing unit 10 is efficiently cooled.

Also, end portions x2 on an inward side in the left-right direction of the left and right airflow guide holes 315 are formed on an inward side in the left-right direction of end portions x3 on an outward side in the left-right direction of the PCU 320 when viewed from the vehicle front-rear direction. Thereby, at least some of the traveling wind W1 introduced into the center tunnel CT from the left and right airflow guide holes 315 is directly applied to a portion on the outward side in the left-right direction of the PCU 320 and thus the PCU 320 is efficiently cooled.

Referring to FIGS. 11 to 13, a plurality of fastening bosses 334 for fastening the junction box 323 are provided to stand upright on the upper surface portion of the PCU 320 together with the plurality of heat-dissipation fins 333. The junction box 323 has a rectangular shape smaller than the PCU 320 in a plan view and is disposed such that front and rear sides extend in the left-right direction and left and right sides extend in the front-rear direction. Fastening parts 323a for the PCU 320 are provided at four corners of the junction box 323 in a plan view. In a state in which the fastening parts 323a are fastened to the corresponding fastening bosses 334, the junction box 323 is fixed in a state in which it is disposed above the PCU 320 at an interval to overlap therewith.

Referring to FIG. 3, the vehicle body frame 11 includes the front middle stage cross frame 147, the front lower cross frame 148, and the center cross frame 155 as cross frames that connect the pair of left and right frame members. Each of the cross frames 147, 148, and 155 is disposed to overlap at least a portion of the PCU 320 in a plan view. The front middle stage cross frame 147 is disposed to overlap at least a portion of the PCU 320 when viewed in the vehicle front-rear direction. Disturbances from a lateral side of the vehicle with respect to the PCU 320 can be more firmly reduced by these cross frames 147, 148, and 155. Also, disturbances from the front of the vehicle with respect to the PCU 320 can be reduced by the front middle stage cross frame 147.

The motorcycle 1 includes the charger 325 for charging the battery 100 in a vehicle-mounted state. The charger 325 is disposed below the PCU 320 at an interval to overlap therewith. When viewed from above, the charger 325 and the PCU 320 are disposed to overlap each other. The charger 325 is smaller than the housing 332 of the PCU 320 in the vehicle width direction (see FIG. 12) and is disposed on an inward side from the left and right down frame parts 18 in the vehicle width direction. Thereby, an influence of disturbances from an outer lateral side with respect to the charger 325 can be reduced.

Referring to FIGS. 12 and 14, the charger 325 is fixed to a lower surface of the PCU 320 via a rack 340. A fastening part 334a for connecting the rack 340 is provided on the PCU 320. The PCU 320, the junction box 323, and the charger 325 are mounted on the vehicle body as a three-layer subassembly. In the subassembly, one end of the three-phase cable 80 is connected to the PCU 320 in advance. After the subassembly is mounted on the vehicle body, the other end of the three-phase cable 80 is connected to the electric motor 30.

The motorcycle 1 includes the junction box 323 to which a plurality of high-voltage lines (output cables 101b, 102b, or the like) are connected. The junction box 323 is disposed above the PCU 320 at an interval to overlap therewith. The junction box 323 and the PCU 320 are disposed to overlap each other when viewed from above. The junction box 323 is fixed to the fastening bosses 334 on the upper surface portion of the PCU 320.

Referring also to FIG. 11, a pair of front and rear terminal blocks 336 for connecting a plurality of high-voltage lines are provided on an upper surface portion of the junction box 323. A plurality of terminal connection parts 336a are provided to be aligned in the left-right direction on the front and rear terminal blocks 336. The output cables 101b and 102b extending from the front and rear batteries 101 and 102 are connected to one of the front and rear terminal blocks 336, and an output cable 336b (see FIG. 16) extending to the contactor 324 is connected to the other of the front and rear terminal blocks 336. For convenience of illustration, illustration of the cables connected to the junction box 323 is omitted in FIGS. 11 and. 12.

The front and rear terminal blocks 336 and the junction box 323 are smaller than the housing 332 of the PCU 320 in entire width in the vehicle width direction and are disposed on an inward side from the left and right down frame parts 18 in the vehicle width direction. The junction box 323 is disposed on an inward side in the left-right direction of the end portions x3 (see FIG. 4) on an outward side of the PCU320 in the left-right direction. Thereby, an influence of disturbances from an outer lateral side with respect to the junction box 323 can be reduced.

The motorcycle 1 includes the contactor 324 that switches the high-voltage lines. The contactor 324 is disposed behind the junction box 323 above the PCU 320. The contactor 324 is smaller than the housing 332 of the PCU 320 in the vehicle width direction and is disposed on an inward side from the left and right down frame parts 18 in the vehicle width direction. Thereby, an influence of disturbances from an outer lateral side with respect to the contactor 324 can be reduced.

The contactor 324 connects the front and rear batteries 101 and 102 in series and connects them to the electric motor 30 side (PCU 320) when the motorcycle 1 travels, and connects the front and rear batteries 101 and 102 in parallel and connects them to the charger 325 side when the batteries are charged. The contactor 324 may be of various types such as a switch type in addition to the electromagnetic switch.

The contactor 324 can obtain a high voltage by connecting the front and rear batteries 101 and 102 in series during travel. When the batteries are charged, the contactor 324 causes a larger amount of current than when traveling to flow to enable quick charging. Therefore, an amount of heat generated by the junction box 323 and the contactor 324 together with the charger 325 increases at the time of charging the batteries.

In the motorcycle 1, the PCU 320 is disposed at intervals between the charger 325, and the junction box 323 and the contactor 324. The charger 325, and the junction box 323 and the contactor 324, which are heat generating components at the time of charging the batteries, are separated from each other with the PCU 320, which is a heat generating component during travel, sandwiched therebetween. Thereby, a heat influence between the heat generating components at the time of charging the batteries can be suppressed.

Referring to FIGS. 2, 3, and 6, an article storage box 313 is provided above the PCU 320 and the junction box 323 in the center tunnel CT. The article storage box 313 may store, for example, a charging cord (not illustrated) that connects the charger 325 and an external power supply. The article storage box 313 has a container shape that opens upward, and an upper opening thereof is disposed along an upper surface of the center tunnel CT. The lid 313a which opens and closes the upper opening of the article storage box 313 is provided on the upper surface of the center tunnel CT. When the lid 313a is provided on the upper surface of the center tunnel CT, the lid 313a can be opened and closed even when the driver is in a riding posture seated on the seat 8.

<Surrounding Structure of Center Tunnel>

Hereinafter, an example in which the article storage box 313 is used as a cord storage part 230 for storing a charging cord 245 will be described.

Figure 20:
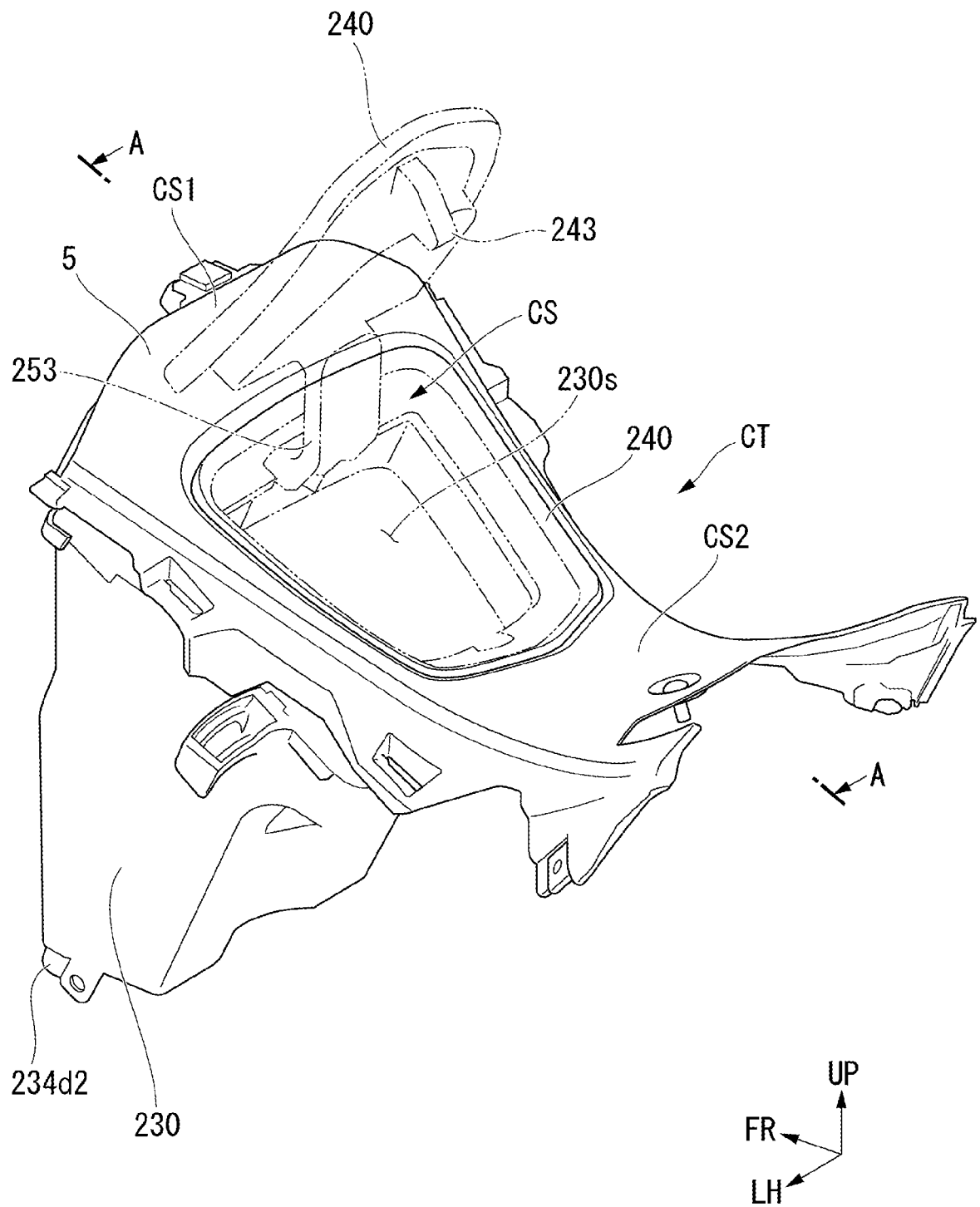
FIG. 20 is a perspective view of an opening/closing structure of a lid according to the embodiment when viewed from behind and from the left.

As illustrated in FIG. 20, a cover inclined surface CS that is inclined to be positioned further downward toward the rear with respect to the ground surface is provided in the center tunnel CT. A lid 240 capable of opening and closing the cord storage part 230 is provided in the center tunnel CT. The lid 240 is disposed on the upper portion of the center tunnel CT. Thereby, it is easy to visually ascertain an open/closed state of the lid 240. In addition, an opening and closing operation of the lid 240 can be easily performed.

In FIG. 20, a solid line indicates when the lid 240 is in a closed state, and a two-dot dashed line indicates when the lid 240 is in an open state.

When the lid 240 is in the closed state, the cover inclined surface CS is continuous with an upper surface of the lid 240 so that they are substantially coplanar with each other. Hereinafter, a portion positioned on an upper portion (front upper portion) of the cover inclined surface CS is also referred to as "inclined surface upper portion CS1," and a portion positioned on a lower portion (rear lower portion) of the cover inclined surface CS is also referred to as "inclined surface lower portion CS2." The inclined surface upper portion CS1 corresponds to a front end portion of the upper surface portion CT1 (see FIG. 3). The inclined surface lower portion CS2 corresponds to a rear end portion of the upper surface portion CT1 (see FIG. 3). The inclined surface lower portion CS2 corresponds to a portion including the lowest portion CT2 (see FIG. 3).

<Lid Open/Close Detection Unit>

Figure 21:
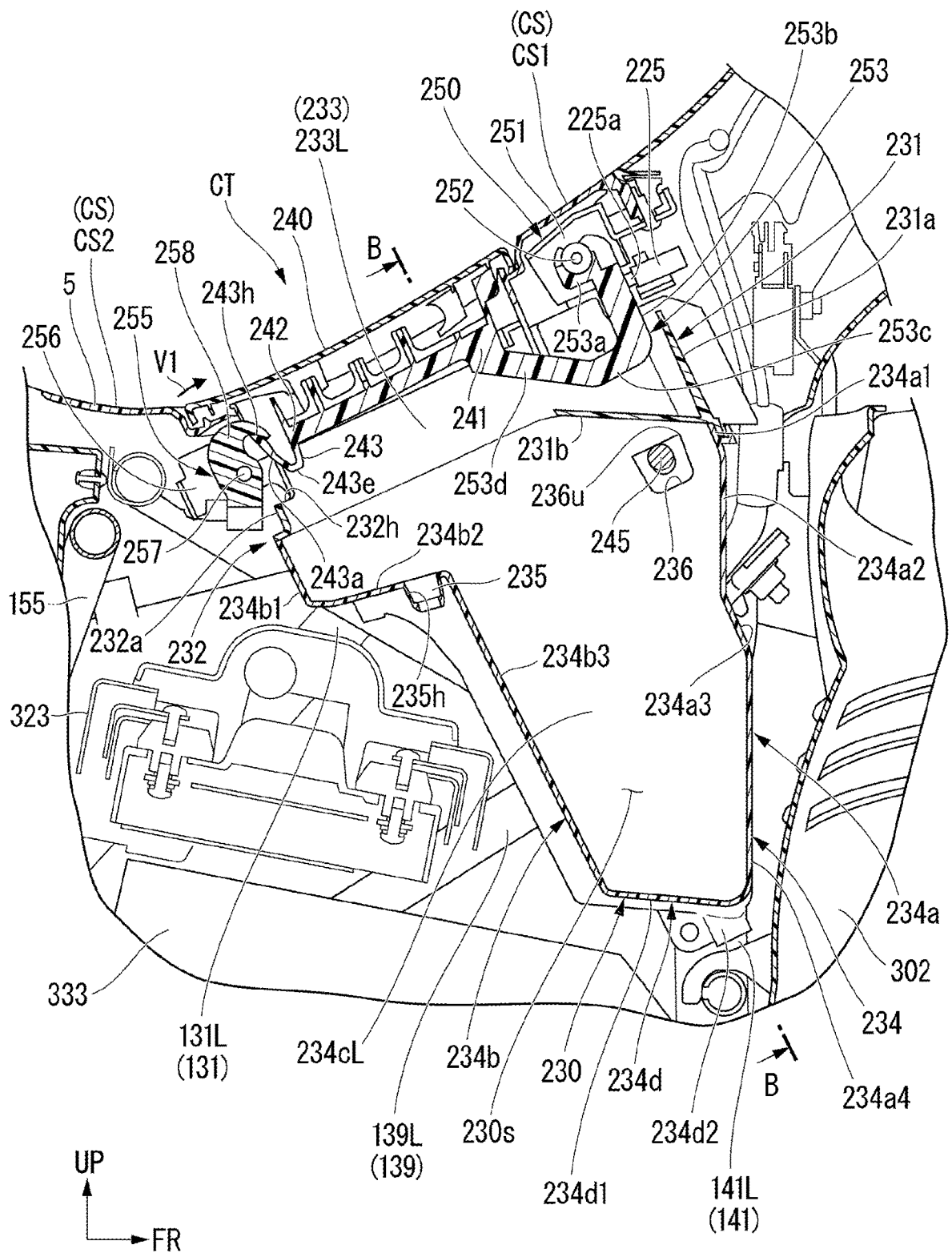
FIG. 21 is a cross-sectional view taken along line A-A of FIG. 20.

As illustrated in FIG. 21, the lid open/close detection unit 225 capable of detecting an open/closed state of the lid 240 is provided in the center tunnel CT. The lid open/close detection unit 225 is disposed in the vicinity of the inclined surface upper portion CS1. For example, the lid open/close detection unit 225 includes a contact-type displacement sensor 225*a*.

The lid open/close detection unit 225 determines an open/closed state of the lid 240 on the basis of a gap generated between the lid 240 and the vehicle body cover 5. Here, the term "gap" means a gap generated between the lid 240 and the vehicle body cover 5 when the charging cord 245 is sandwiched between the lid 240 and the vehicle body cover 5. A size of the gap has substantially the same size as an outer diameter dimension of a portion of the charging cord 245 sandwiched between the lid 240 and the vehicle body cover 5. For example, when the lid 240 is closed in a state in which the charging cord 245 is drawn out (see FIG. 25(*b*) and FIG. 25(*c*)) from the cord storage part 230 to the outside, a gap corresponding to the outer diameter dimension of the charging cord 245 is generated between the lid 240 and the vehicle body cover 5.

Figure 23:
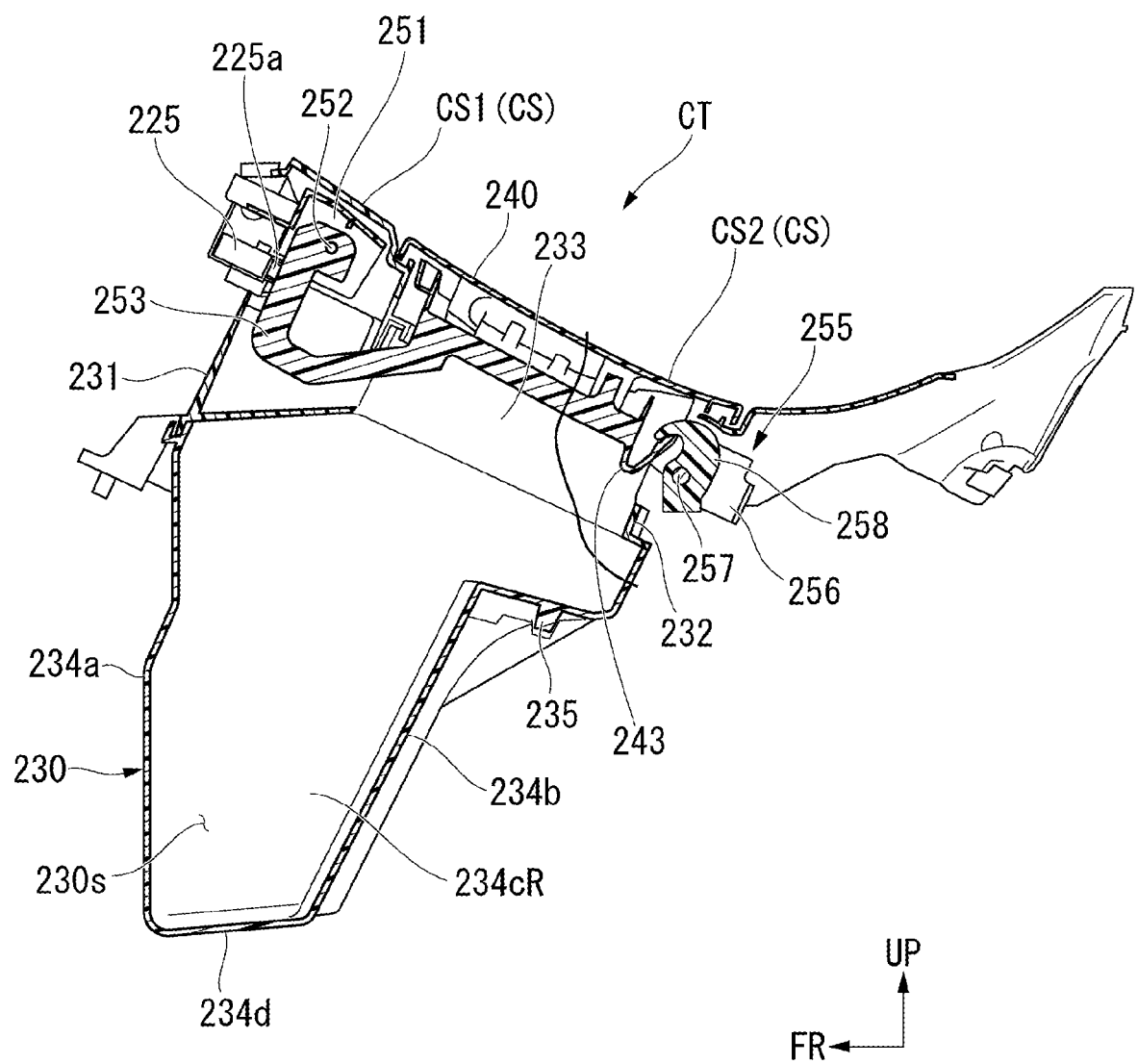
FIG. 23 is a view including a cross section illustrating a closed state of the lid according to the embodiment.
Figure 24:
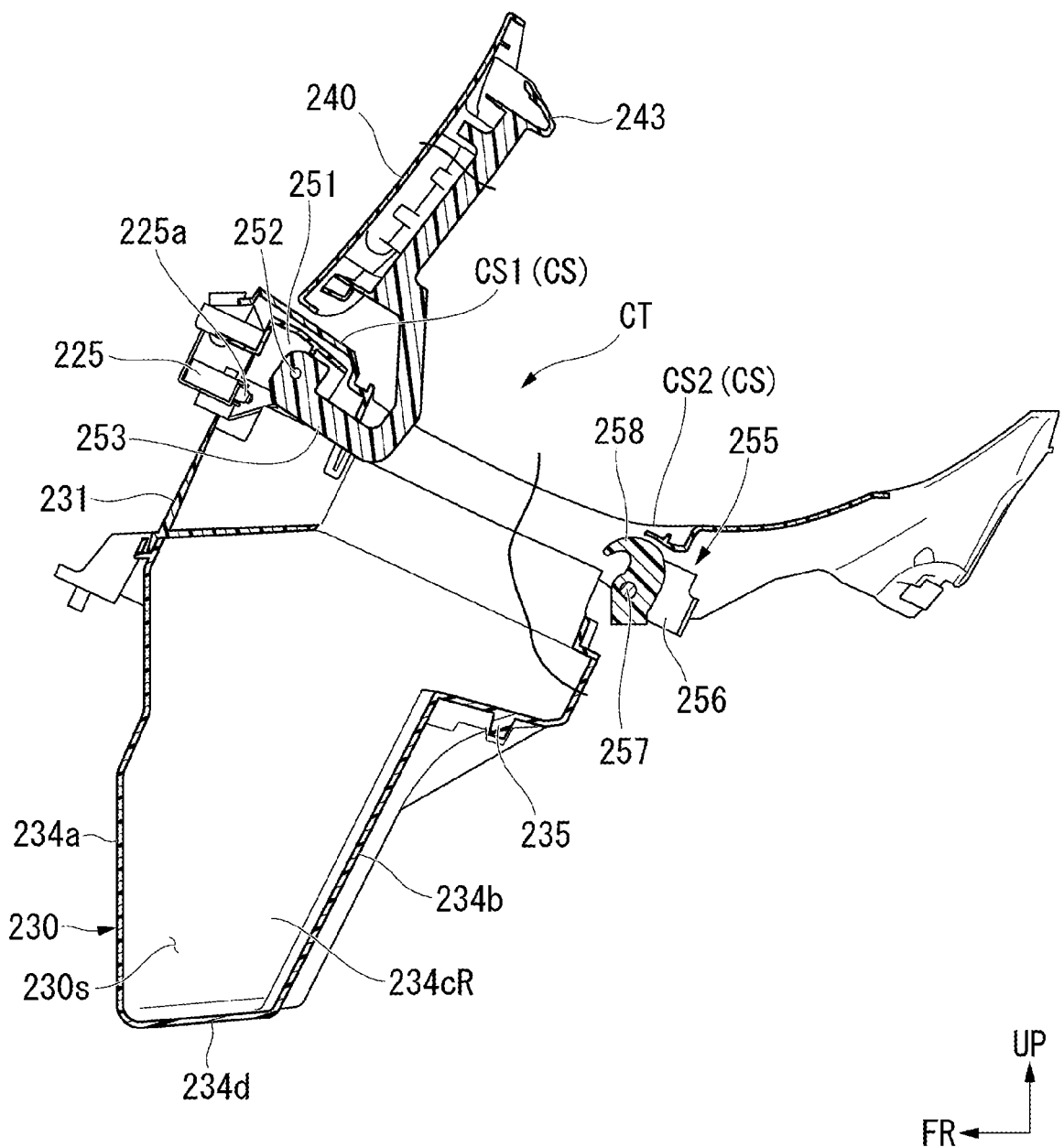
FIG. 24 is a view including a cross section illustrating an open state of the lid according to the embodiment.

The lid open/close detection unit 225 determines a size of the gap on the basis of a pushed-in amount of a hinge arm 253. FIG. 23 illustrates a state in which the contact-type displacement sensor 225*a* is pushed by the hinge arm 253. FIG. 24 illustrates a state in which the contact-type displacement sensor 225*a* is not pushed by the hinge arm 253.

The lid open/close detection unit 225 determines that the lid 240 is in an open state when the gap is equal to or larger than a minimum outer diameter dimension of the charging cord 245.

The lid open/close detection unit 225 determines that the lid 240 is in a closed state when the gap is less than the minimum outer diameter dimension of the charging cord 245.

Here, "minimum outer diameter dimension of the charging cord 245" means a smallest diameter dimension among outer diameter dimensions of the charging cord 245 in a direction in which the charging cord 245 extends. When the charging cord 245 is protected by a protective tube or the like, the outer diameter dimension of the charging cord 245 includes a dimension including a thickness of the protective tube or the like.

For example, the charging cord 245 may be a curl cord and freely deformable. A connection plug 246 (see FIG. 25) that can be connected to an external power supply is provided in the charging cord 245. The charging cord 245 connects the charger 325 (see FIG. 3) and an external power supply.

Figure 25:
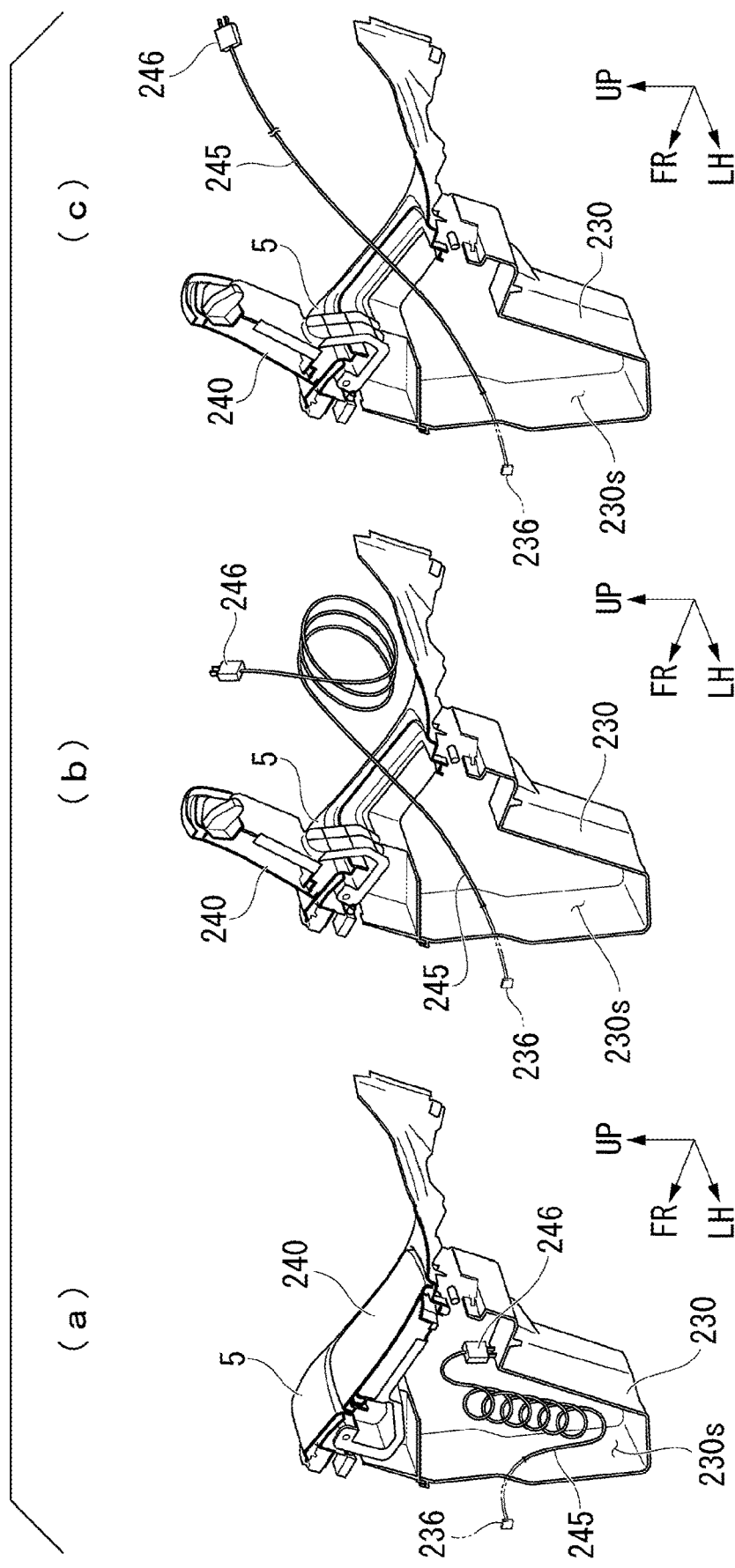
FIG. 25 shows perspective views illustrating a charging cord according to the embodiment.

For example, the charging cord 245 can be stored in the cord storage part 230 in a state in which the charging cord 245 is spirally wound (see FIG. 25(*a*)).

For example, the charging cord 245 can be drawn out to the outside of the cord storage part 230 in a state in which a portion of the charging cord 245 is spirally wound (see FIG. 25(*b*)).

For example, the charging cord 245 can be drawn out to a position far away from a cord draw-out part 236 in a state in which the winding of the charging cord 245 is released (see FIG. 25(*c*)).

<Notification Device>

A notification device 226 (see FIG. 5) which notifies the rider on the basis of a detection result of the lid open/close detection unit 225 is provided inside the center tunnel CT. In the front view of FIG. 5, the notification device 226 is disposed on a side opposite to a horn 227 with the vehicle body left-right center line CL sandwiched therebetween. The notification device 226 is disposed on the left side of the vehicle body. For example, the notification device 226 may be a speaker.

For example, the notification device 226 issues an alarm (first alarm) when the lid open/close detection unit 225 detects an open state of the lid 240. For example, the notification device 226 issues a second alarm that is different from the first alarm when the lid open/close detection unit 225 detects a closed state of the lid 240. The notification device 226 may not issue an alarm when the lid open/close detection unit 225 detects a closed state of the lid 240.

<Hinge Mechanism>

As illustrated in FIG. 21, a hinge mechanism 250 capable of opening and closing the lid 240 is provided in the center tunnel CT. The hinge mechanism 250 is disposed in the vicinity of the inclined surface upper portion CS1.

The hinge mechanism 250 includes a hinge bracket 251 fixed to a lower portion of the inclined surface upper portion CS1, a hinge shaft 252 extending in the vehicle width direction and having an end portion fixed to the hinge bracket 251, and the hinge arm 253 rotatably attached to the hinge shaft 252.

In a cross-sectional view of FIG. 21, the hinge arm 253 includes a hinge shaft support part 253*a* rotatably attached to the hinge shaft 252, an arm front-half part 253*b* that extends obliquely forward and downward in a straight line from the hinge shaft support part 253*a*, an arm intermediate part 253*c* that is continuous with a lower end of the arm front-half part 253*b* and extends obliquely rearward and downward, and an arm rear-half part 253*d* that is continuous with a rear end of the arm intermediate part 253*c* and extends obliquely rearward and upward. A front lower portion 241 of the lid 240 is connected to a rear end of the arm rear-half part 253*d*.

A forward/downward protruding part 243 that protrudes forward and downward is provided at a rear lower portion 242 of the lid 240. In the cross-sectional view of FIG. 21, the forward/downward protruding part 243 includes a lock wall 243*a* that is inclined to be positioned further upward toward the rear. A lock hole 243*h* that opens to the front and rear so that a hook 258 of a lock mechanism 255 can be inserted therethrough is provided in the lock wall 243*a*.

<Lock Mechanism>

As illustrated in FIG. 21, the lock mechanism 255 capable of locking the lid 240 is provided in the center tunnel CT.

The lock mechanism 255 is disposed in the vicinity of the inclined surface lower portion CS2.

The lock mechanism 255 includes a lock bracket 256 fixed to a lower portion of the inclined surface lower portion CS2, a lock shaft 257 extending in the vehicle width direction and having an end portion fixed to the lock bracket 256, the hook 258 rotatably attached to the lock shaft 257, a biasing member (not illustrated) connected to the lock bracket 256 and the hook 258, a lid wire (not illustrated) connected to the hook 258, and an actuator (not illustrated) capable of rotating the hook 258.

The biasing member (not illustrated) applies a biasing force with respect to the hook 258 in an arrow V1 direction around the lock shaft 257 so that the hook 258 is locked to the lock wall 243a. For example, the biasing member may be a coil spring.

An actuator (not illustrated) can apply a force against the biasing force of the biasing member with respect to the hook 258 in a direction opposite to the arrow V1 direction so that the hook 258 is disengaged from the lock wall 243a. For example, a cable (not illustrated) may be connected between the hook 258 and the actuator. The actuator can release engagement of the hook 258 by pulling the cable (not illustrated) against the biasing force of the biasing member.

<Cord Storage Part>

As illustrated in FIG. 21, the cord storage part 230 capable of storing the charging cord 245 is provided in the center tunnel CT. The cord storage part 230 has a box shape that opens upward. The cord storage part 230 can store articles other than the charging cord 245. For example, other articles can also be stored in the cord storage part 230 in a state in which the charging cord 245 is stored in the cord storage part 230.

The cord storage part 230 is disposed between the left and right upper frames 13, the left and right down frames 14a, and the left and right middle frames 17. An upper portion of the cord storage part 230 is disposed between the left and right upper frames 13. A lower portion of the cord storage part 230 is disposed between the left and right down frames 14a and the left and right middle frames 17.

The cord storage part 230 includes a hinge storage part 231 capable of storing the hinge mechanism 250, a lock storage part 232 capable of storing the lock mechanism 255, a pair of left and right connecting parts 233L and 233R which connect the hinge storage part 231 and the lock storage part 232, and a cord storage main body 234 capable of storing the charging cord 245.

The hinge storage part 231 is disposed on a front upper side of the cord storage main body 234. The hinge storage part 231 is positioned in the vicinity of the inclined surface upper portion CS1. When the lid 240 is in a closed state, the hinge storage part 231 includes a hinge front wall 231a positioned in front of the hinge mechanism 250 and a hinge lower wall 231b positioned below the hinge mechanism 250. In the cross-sectional view of FIG. 21, the hinge front wall 231a extends obliquely in a straight line to be positioned further downward toward the front. In the cross-sectional view of FIG. 21, the hinge lower wall 231b is continuous with a lower end of the hinge front wall 231a and extends obliquely in a straight line to be positioned further upward toward the rear.

The lock storage part 232 is disposed on a rear upper side of the cord storage main body 234. The lock storage part 232 is positioned in the vicinity of the inclined surface lower portion CS2. When the lid 240 is in a closed state, the lock storage part 232 includes a lock lower wall 232a positioned below the lock mechanism 255. In the cross-sectional view of FIG. 21, the lock lower wall 232a is formed in an L-shape that is inclined to be positioned further downward toward the front in substantially parallel with the hinge front wall 231a, and then extends to be bent rearward and downward. An opening part 232h that opens to the front and rear to allow the hook 258 of the lock mechanism 255 to rotate is provided in the lock storage part 232.

The left and right connecting parts 233L and 233R respectively stretch in the front-rear direction between the hinge storage part 231 and the lock storage part 232. In the cross-sectional view of FIG. 21, connecting parts 233 extend obliquely to be positioned further downward toward the rear.

The cord storage main body 234 includes wall parts that are positioned on the front, rear, left, right, and a bottom part of the cord storage part 230. Hereinafter, in the cord storage part 230, a wall part positioned on a front side is also referred to as a "front wall part 234a," a wall part positioned on a rear side is also referred to as a "rear wall part 234b," a wall part positioned on a left side is also referred to as a "left wall part 234cL," a wall part positioned on a right side is also referred to as a "right wall part 234cR," and a wall part positioned on the bottom part is also referred to as a "storage bottom part 234d."

In the cross-sectional view of FIG. 21, the front wall part 234a includes a front wall upper coupling part 234a1 coupled to a front lower end of the hinge lower wall 231b, a front wall upper half part 234a2 that is continuous with a lower end of the front wall upper coupling part 234a1 and extends downward in a straight line, a front wall intermediate part 234a3 that is continuous with a lower end of the front wall upper half part 234a2 and extends to be bent forward and downward, and a front wall intermediate part 234a4 that is continuous with a lower end of the front wall intermediate part 234a3 and extends downward in a straight line.

In the cross-sectional view of FIG. 21, the rear wall part 234b includes a rear wall upper half part 234b1 that is continuous with a rear lower end of the lock lower wall 232a and extends obliquely to be positioned further downward toward the front, a rear wall intermediate part 234b2 that is continuous with a lower end of the rear wall upper half part 234b1 and extends to be bent forward and upward, and a rear wall lower half part 234b3 that is continuous with a front end of the rear wall intermediate part 234b2 and extends obliquely in a straight line to be positioned further downward toward the front.

The left and right wall parts 234cL and 234cR respectively stretch in the front-rear direction between left ends and between right ends of the front and rear wall parts 234a and 234b. In a cross-sectional view of FIG. 22, the left and right wall parts 234cL and 234cR include left and right coupling parts 234c1 that are continuous with the front wall upper coupling part 234a1 (see FIG. 21) and coupled to lower ends of the left and right connecting parts 233L and 233R, and left and right wall main bodies 234c2 that are continuous with inward ends in the vehicle width direction of the left and right coupling parts 234c1 and extend obliquely in a straight line to be positioned further inward in the vehicle width direction toward a lower side thereof.

The storage bottom part 234d stretches in the front-rear direction between lower ends of the front and rear wall parts 234a and 234b (see FIG. 21) and stretches in the vehicle width direction between lower ends of the left and right wall parts 234cL and 234cR. In the cross-sectional view of FIG. 22, the storage bottom part 234d includes a bottom part main body 234d1 that extends obliquely in a straight line to be positioned further downward toward a left side, and a downward protruding part 234d2 that is continuous with a left end of the bottom part main body 234d1 and protrudes downward.

In the cross-sectional view of FIG. 21, the bottom part main body 234d1 extends obliquely in a straight line to be positioned further downward toward the front. The storage bottom part 234d is formed to be deepest on the inclined surface upper portion CS1 side.

Figure 22:
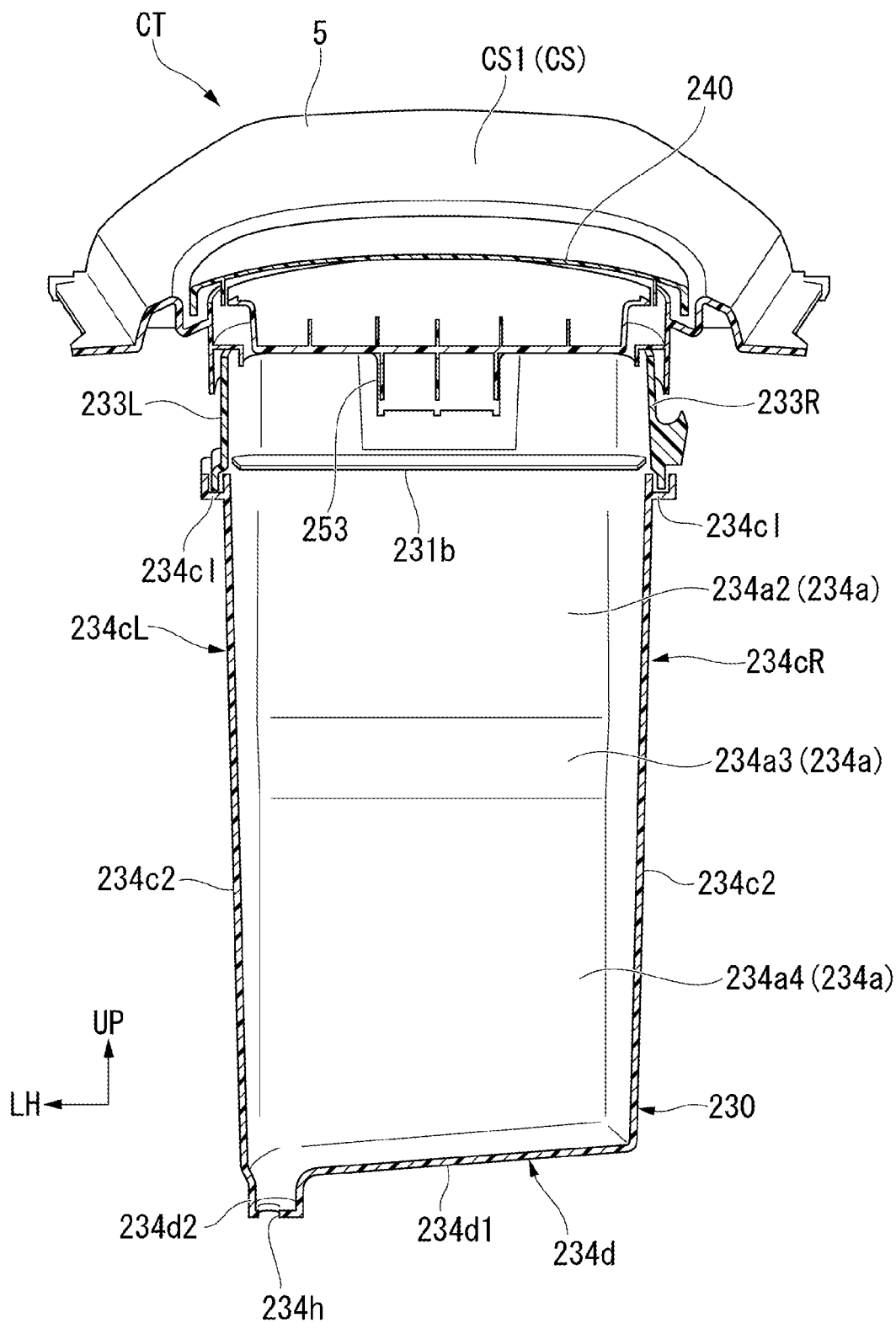
FIG. 22 is a cross-sectional view taken along line B-B of FIG. 21.

As illustrated in FIG. 22, a drain hole 234h that opens upward and downward is provided at a lower end of the downward protruding part 234d2.

<Plug Fixing Part>

As illustrated in FIG. 21, a plug fixing part 235 capable of fixing the connection plug 246 (see FIG. 25) is provided in the cord storage part 230. The plug fixing part 235 is disposed in the vicinity of the inclined surface lower portion CS2. The plug fixing part 235 is provided to protrude forward and downward from the rear wall intermediate part 234b2. For example, an insertion hole 235h into which the connection plug 246 can be inserted from above is provided in the plug fixing part 235.

<Cord Draw-Out Part>

As illustrated in FIG. 21, the cord draw-out part 236 that allows the charging cord 245 to be drawn out into the cord storage part 230 is provided in the cord storage part 230. The cord draw-out part 236 is a hole that opens the left wall part 234cL of the cord storage part 230 in the vehicle width direction.

In the cross-sectional view of FIG. 21, the cord draw-out part 236 is formed in a rectangular shape having an upper side that is linearly inclined to be positioned further downward toward the rear. A length of each side of the cord draw-out part 236 is larger than a diameter of the charging cord 245. In the vertical direction, the cord draw-out part 236 overlaps the rear lower portion 242 of the lid 240. An upper end 236u of the cord draw-out part 236 is positioned on a side above the plug fixing part 235. The cord draw-out part 236 is disposed on a side above a lower end 243e of the lid 240.

A storage space 230s of the cord storage part 230 extends to a lowest side below the cord draw-out part 236. The storage space 230s can store the charging cord 245 drawn out from the cord draw-out part 236 in a portion ranging from the vicinity of an upper portion of the inclined surface upper portion CS1 to the lower portion of the cord storage part 230.

As described above, the motorcycle 1 according to the above-described embodiment includes the electric motor 30 for vehicle traveling, the battery 100 which supplies electric power to the electric motor 30, the PCU 320 which controls the electric motor 30, the step floors 9 on which a rider places his/her feet, the center tunnel CT which extends in the vehicle front-rear direction at the left-right center portion of the step floors 9, and the charger 325 mounted on the vehicle body and configured to charge the battery 100, in which the PCU 320 is disposed inside the center tunnel CT, and the charger 325 is disposed below the PCU 320 to overlap the PCU 320 in a plan view.

According to this configuration, since the charger 325 is disposed below the PCU 320, heat of the PCU 320 can be easily released upward and a cooling performance of the PCU 320 can be improved. Also, when the charger 325 is disposed below the PCU 320, an influence of disturbances from below the vehicle on the PCU 320 during travel can be reduced and the PCU 320 can be better protected.

There may be a configuration in which the charger 325 is disposed above the PCU 320. When the charger 325 is disposed above the PCU 320, the charger 325 can be easily accessed from above and usability of the charger 325 can be improved.

Second Embodiment

Figure 17:
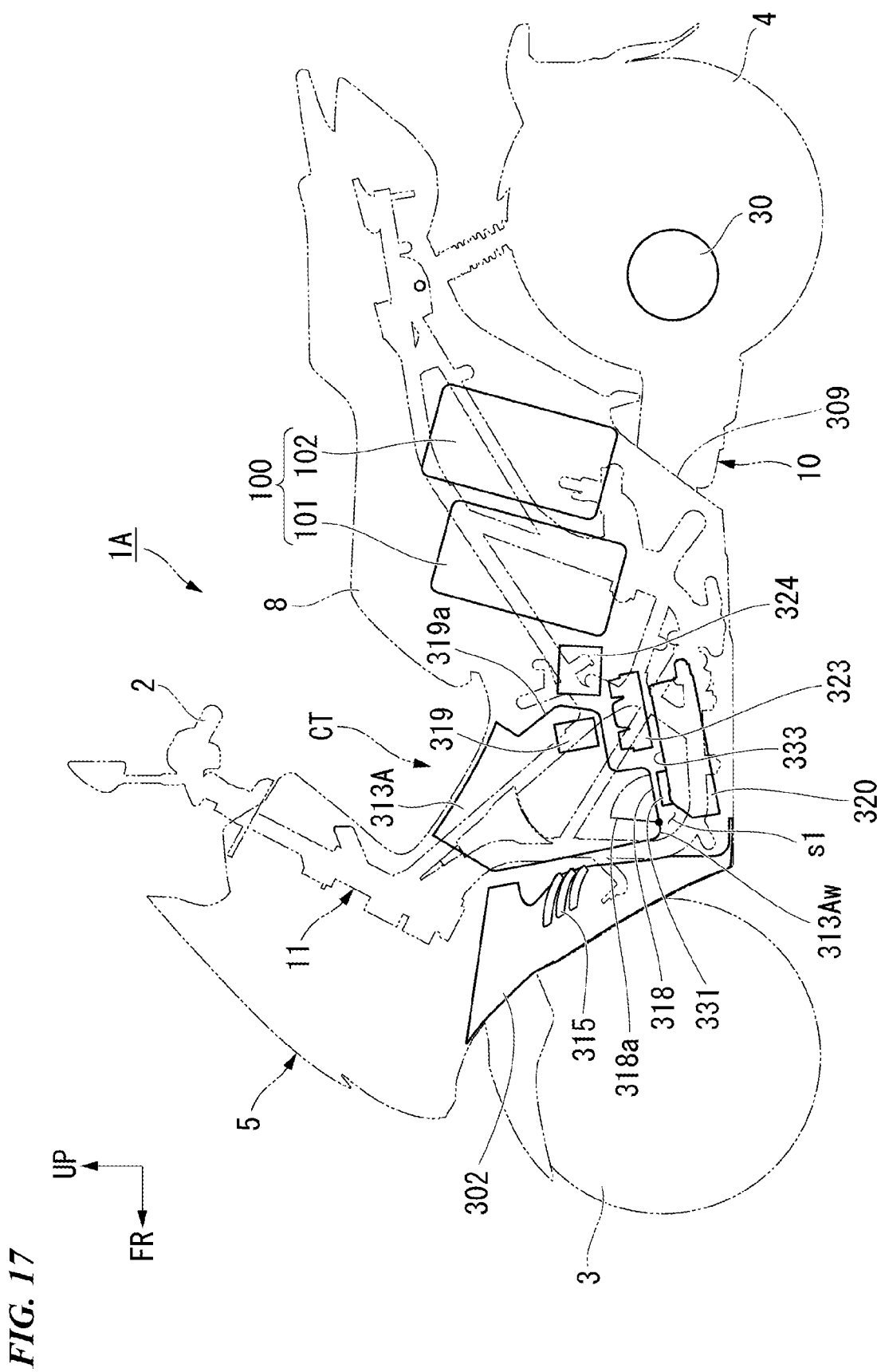
FIG. 17 is a left side view of a motorcycle according to a second embodiment corresponding to FIG. 6.

Next, a second embodiment of the present invention will be described with reference to FIG. 17.

A motorcycle 1A of this embodiment is particularly different from the first embodiment in that a power control unit (PCU) 320 and a junction box 323 are moved downward by removing the charger 325 and thereby an article storage box 313A larger than that in the first embodiment is provided. The same components as those in the first embodiment are denoted by the same reference signs, and detailed description thereof will be omitted.

The PCU 320 is disposed such that at least a terminal block 331 is positioned above floor surfaces 9a. The terminal block 331 may be disposed, for example, on an upper surface portion of a housing 332. The terminal block 331 is disposed to face a bottom wall part 313Aw side at a position facing the bottom wall part (wall part) 313Aw of the article storage box 313A. An opening part 318 having a maintenance lid 318a is formed at a portion of the bottom wall part 313Aw of the article storage box 313A facing the terminal block 331. Thereby, the terminal connection parts 331a can be accessed from the inside of the article storage box 313A. Therefore, maintainability of the PCU 320 can be secured while the article storage box 313A is disposed above the PCU 320.

The bottom wall part 313Aw of the article storage box 313A forms a ventilation path s1 in cooperation with an upper surface portion of the PCU 320. The ventilation path s1 rectifies traveling wind introduced into a center tunnel CT from an airflow guide hole 315 and causes it to flow to the rear, and thereby a flow velocity of the traveling wind is increased. Heat-dissipation fins 333 of the PCU 320 face the ventilation path s1, and thus a cooling performance of the PCU 320 is improved.

For example, the motorcycle 1A may include a reserve battery 319 in addition to front and rear batteries 101 and 102. In this case, a battery storage part 319a for storing the reserve battery 319 may be provided in at least a portion of the article storage box 313A.

Third Embodiment

Figure 18:
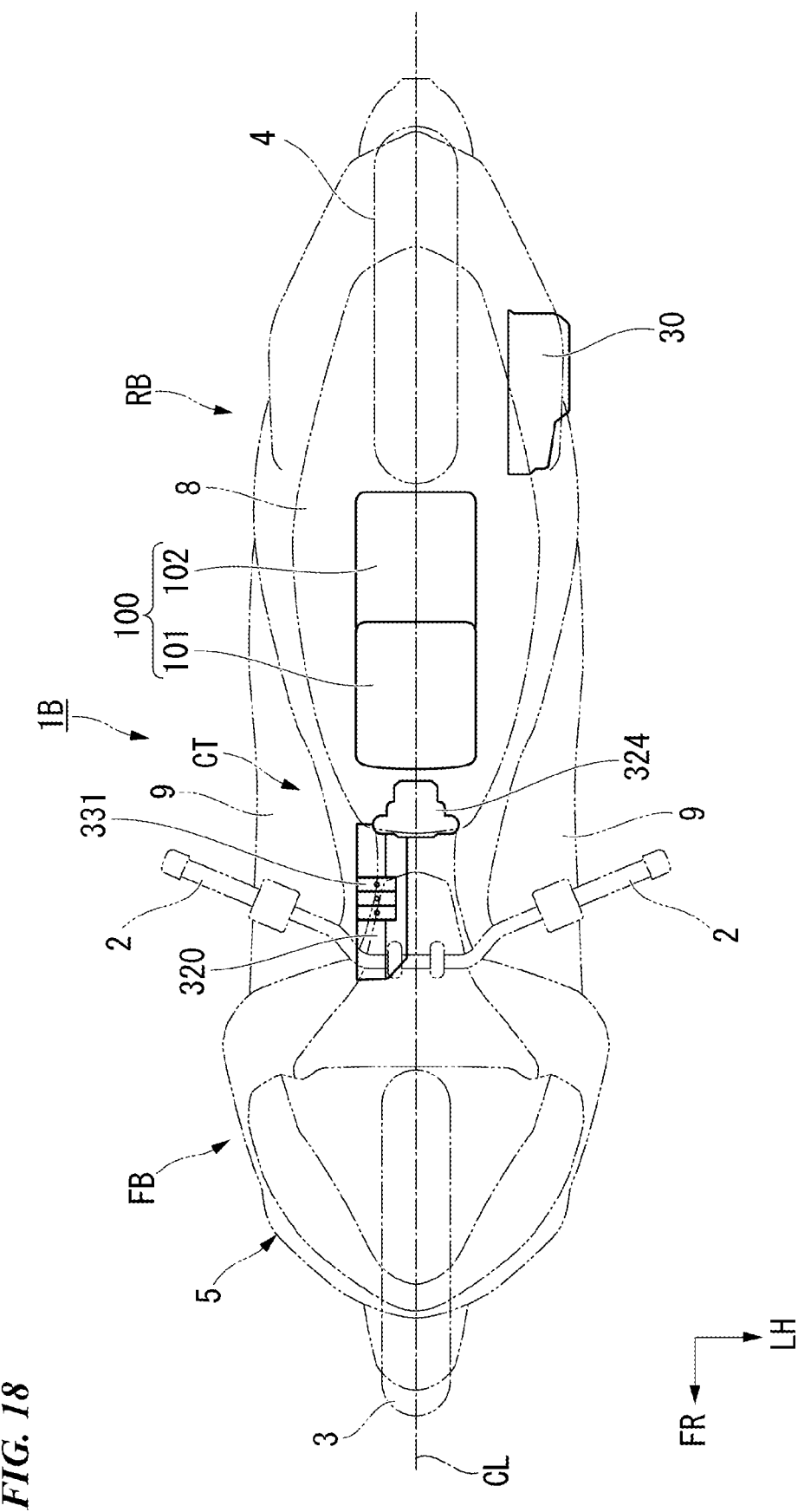
FIG. 18 is a top view of a motorcycle according to a third embodiment corresponding to FIG. 7.
Figure 19:
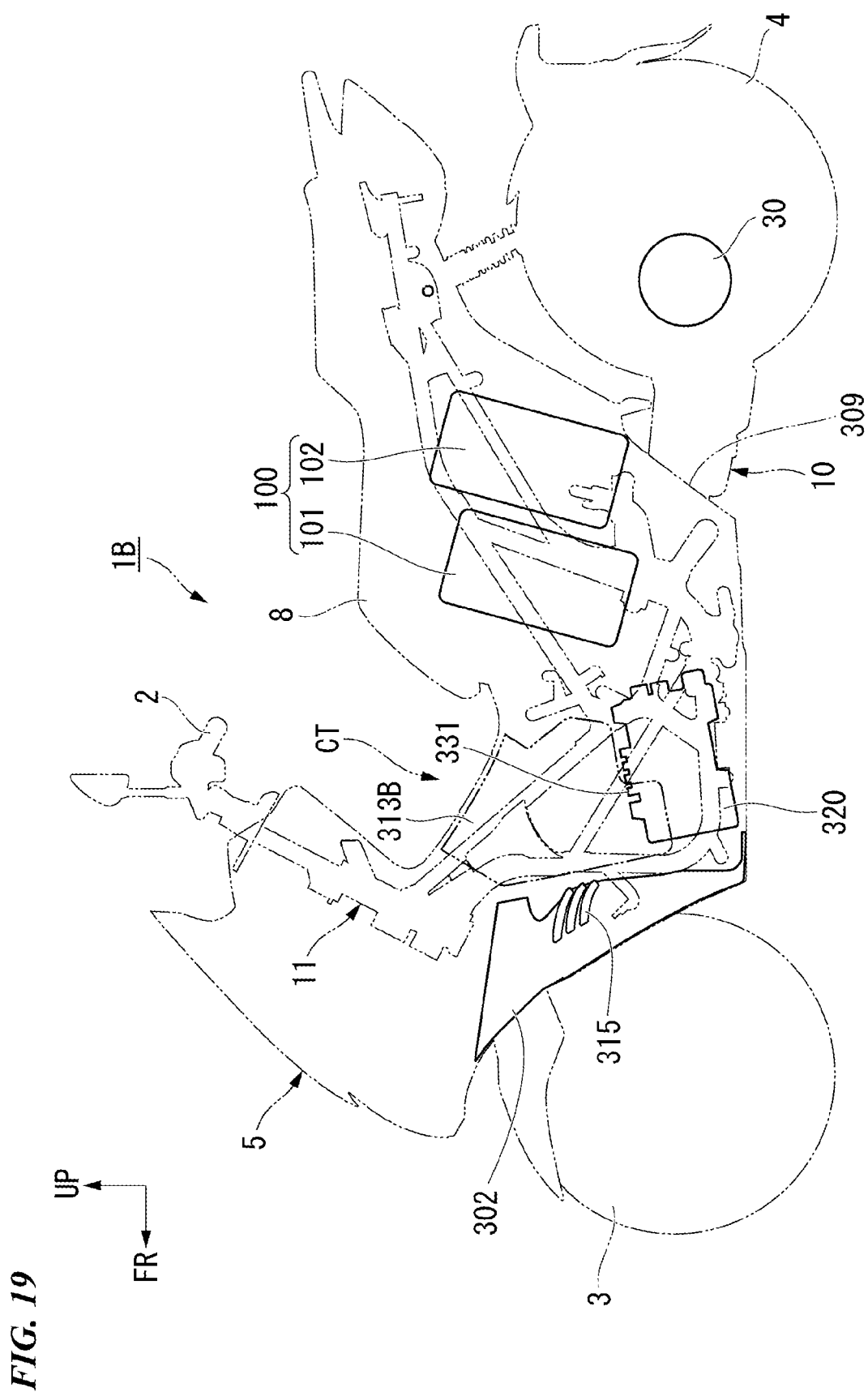
FIG. 19 is a left side view of the motorcycle according to the third embodiment corresponding to FIG. 6.

Next, a third embodiment of the present invention will be described with reference to FIGS. 18 and 19.

A motorcycle 1B of this embodiment is particularly different from the first embodiment in that a charger 325 is removed and a power control unit (PCU) 320 is disposed to be vertically mounted on one side in a vehicle width direction to have a large article storage box 313B that is biased to the other side in the vehicle width direction than that in the first embodiment. The same components as those in the first embodiment are denoted by the same reference signs, and detailed description thereof will be omitted.

The PCU 320 is disposed in an upright posture with a thickness direction of a housing 332 directed in a left-right direction. The PCU 320 is disposed offset to a left side with respect to a vehicle body left-right center CL. An electric motor 30 is disposed offset to a right side with respect to the vehicle body left-right center CL. The PCU 320 is disposed offset to a side opposite to the electric motor 30 in the left-right direction with respect to the vehicle body left-right center CL.

Since the PCU 320, which is a heavy weight, is disposed to be shifted to a side opposite to the electric motor 30 in the left-right direction, a left-right weight balance of the motorcycle 1B is improved. Since the PCU 320 having a flat outer shape is disposed in a vertically mounted posture with the thickness direction directed in the left-right direction, the PCU 320 can be easily offset in the left-right direction. At least one of the PCU 320 and the electric motor 30 may be disposed to overlap the vehicle body left-right center CL.

The PCU 320 is disposed such that at least a terminal block 331 is positioned above floor surfaces 9a. The terminal block 331 may be disposed, for example, on an upper surface portion of the housing 332.

For example, as in the second embodiment, the terminal block 331 may be disposed at a position facing a wall part of the article storage box 313B. Also, the PCU 320 and the wall part of the article storage box 313B may form a ventilation path through which traveling wind introduced into the center tunnel CT from the airflow guide hole 315 flows. Also, an opening part for maintenance may be provided in the wall part of the article storage box 313B facing the terminal block 331. Further, a battery storage part for storing a reserve battery may be provided in the article storage box 313B.

The present invention is not limited to the above-described embodiments and may be applied to, for example, a vehicle equipped with a single battery depending on a performance of a battery, specifications of a vehicle, or the like. However, it is effective to install a plurality of batteries to extend a cruising distance. Also, at least one battery may be used as a reserve battery. Also, control of switching the number of batteries used may be made possible. Also, an operation unit such as a switch which switches the number of batteries used may be provided. Further, since a flow velocity of traveling wind is high below the vehicle body, heat-dissipation fins may be provided on a lower surface portion of the PCU.

The saddle-type electric vehicle to which the present invention is applied is not limited to the application to motorcycles, and includes general vehicles on which a driver straddles the vehicle body to ride, also including three wheeled vehicles (such as vehicles with two front wheels and one rear wheel as well as vehicles with one front wheel and two rear wheels) or four-wheeled vehicles. Further, the present invention may be applied to vehicles in which an electric motor for travel is provided in a front wheel (steering wheel).

The configuration in the above-described embodiment is an example of the present invention, and various changes can be made without departing from the scope of the present invention such as replacing the components of the embodiment with well-known components.

REFERENCE SIGNS LIST 1, 1A, 1B Motorcycle (saddle-type electric vehicle)
3 Front wheel (vehicle wheel, steering wheel)
3a Axle
3w Wheel
3w1 Upper end
H1 Range
4 Rear wheel (vehicle wheel, drive wheel)
4w Wheel
8 Seat
9 Step floor
11 Vehicle body frame
12 Head pipe
13 Upper frame (frame member)
14a Down frame (frame member)
14b Lower frame
14c Rear frame (second frame member)
15 Rear upper frame (second frame member)
16 Rear lower frame (second frame member)
17 Middle frame
18 Down frame part
30 Electric motor
100 Battery
101 Front battery
102 Rear battery
147 Front middle stage cross frame (cross frame)
230 Cord storage part (cable storage part)
245 Charging cord (charging cable)
309 Airflow guide outlet part
R2 Airflow guide path region
L2 Airflow guide path center line
313, 313A, 313B Article storage box (article storage part)
315 Airflow guide hole (airflow guide part)
x1 End portion on outward side in left-right direction
x2 End portion on inward side in left-right direction
313Aw Bottom wall part (wall part)
318 Opening part
318a Maintenance lid (second lid)
s1 Ventilation path
319 Reserve battery
319a Reserve battery storage part
320 PCU (power control unit)
x3 End portion on outward side in left-right direction
321 PDU (high-voltage board)
322 ECU (control board)
323 Junction box (distributor)
324 Contactor
325 Charger (charger)
CT Center tunnel
CT1 Upper surface portion
CT2 Lowest portion
333 Heat-dissipation fin
L1 Extension line
331a Terminal connection part (first connection part)
331c Rib (insulating member)
336a Terminal connection part (second connection part)

The invention claimed is:

1. A saddle-type electric vehicle including a saddle-type electric vehicle of a low-floor type in which a straddling space is formed above a center tunnel comprising:
    an electric motor for vehicle traveling;
    a battery which supplies electric power to the electric motor;
    a power control unit which controls the electric motor;
    step floors on which a rider places his/her feet;
    the center tunnel which extends in a vehicle front-rear direction at a left-right center portion of the step floors;
    a charger mounted on the vehicle body and configured to charge the battery; and
    a contactor which switches high-voltage lines between at the time of vehicle traveling and at the time of battery charging, wherein
    the power control unit and the contactor are disposed inside the center tunnel and in front of the battery,
    the charger is disposed to overlap the power control unit in a plan view, and
    the contactor is disposed between the power control unit and the battery in a side view and is disposed to overlap the charger in a plan view.

2. The saddle-type electric vehicle according to claim 1, wherein the charger is disposed below the power control unit.

3. The saddle-type electric vehicle according to claim 2, wherein the contactor is disposed above the power control unit.

4. The saddle-type electric vehicle according to claim 1, further comprising:
  a cable storage part which is able to store a charging cable, wherein
  the cable storage part is disposed above the power control unit.

* * * * *